(12) United States Patent
Compton et al.

(10) Patent No.: US 10,884,872 B2
(45) Date of Patent: Jan. 5, 2021

(54) DEVICE RESERVATION STATE PRESERVATION IN DATA MIRRORING

(71) Applicant: International Business Machines Corporation, Armonk, NY (US)

(72) Inventors: Scott B. Compton, Hyde Park, NY (US); Matthew R. Craig, Sahuarita, AZ (US); Clint A. Hardy, Tucson, AZ (US); Matthew J. Kalos, Tucson, AZ (US); Carol S. Mellgren, Tucson, AZ (US); John G. Thompson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/365,621

(22) Filed: Mar. 26, 2019

(65) Prior Publication Data

US 2019/0220370 A1 Jul. 18, 2019

Related U.S. Application Data

(63) Continuation of application No. 15/828,311, filed on Nov. 30, 2017, now Pat. No. 10,282,258.

(51) Int. Cl.
*G06F 3/06* (2006.01)
*G06F 11/14* (2006.01)
(Continued)

(52) U.S. Cl.
CPC .......... *G06F 11/1464* (2013.01); *G06F 3/065* (2013.01); *G06F 3/067* (2013.01);
(Continued)

(58) Field of Classification Search
CPC ......... G06F 3/065; G06F 3/0665; G06F 3/067
See application file for complete search history.

(56) References Cited

U.S. PATENT DOCUMENTS 6,304,980 B1  10/2001  Beardsley et al.
6,446,176 B1   9/2002  West et al.
(Continued)

FOREIGN PATENT DOCUMENTS

EP    2299361       3/2011
WO    2008020310    2/2008
WO    2016098150 A1 6/2016

OTHER PUBLICATIONS

S. Das, et al., "Storage Management for SAP and Oracle: Split Mirror Backup/Recovery With IBM's Enterprise Storage Server (ESS)", International Business Machines Corporation, Total 70 pages.

(Continued)

*Primary Examiner* — Edward J Dudek, Jr.
(74) *Attorney, Agent, or Firm* — William K. Konrad; Konrad, Raynes, Davda and Victor LLP

(57) ABSTRACT

One general aspect of device reservation state preservation in accordance with the present description, provides for an intermediate reservation state, referred to herein as a "peer" reservation state, which may be maintained by a storage controller in the event of a total loss of communication connectivity to the reserving host so long as a peer or partner storage controller of a mirror relationship still has communication connectivity to the host. The peer reservation state as used herein, is a reservation state intermediate between a full reservation state for a device, and a fully released state in which a reservation of the device has been completely released. Other features and aspects may be realized, depending upon the particular application.

18 Claims, 9 Drawing Sheets

(51) Int. Cl.
*G06F 11/20* (2006.01)
*G06F 11/00* (2006.01)

(52) U.S. Cl.
CPC .......... *G06F 3/0665* (2013.01); *G06F 11/004* (2013.01); *G06F 11/1458* (2013.01); *G06F 11/2097* (2013.01); *G06F 11/2071* (2013.01); *G06F 11/2076* (2013.01)

(56) References Cited

U.S. PATENT DOCUMENTS

| | | | |
|---|---|---|---|
| 7,225,307 | B2 | 5/2007 | Micka et al. |
| 7,350,114 | B2 | 3/2008 | Moody, II et al. |
| 7,647,525 | B2 | 1/2010 | Lecrone et al. |
| 7,882,316 | B2 | 2/2011 | Boyd et al. |
| 7,979,396 | B1 | 7/2011 | Krishnamurthy et al. |
| 8,335,899 | B1 | 12/2012 | Meiri et al. |
| 8,341,364 | B2 | 12/2012 | Coronado et al. |
| 8,694,828 | B2 | 4/2014 | Nelson et al. |
| 8,782,358 | B2 | 7/2014 | Broido et al. |
| 8,819,362 | B1 | 8/2014 | Duprey et al. |
| 8,949,183 | B2 | 2/2015 | Hildebrand et al. |
| 9,483,204 | B2 | 11/2016 | Schnapp et al. |
| 10,282,258 | B1* | 5/2019 | Compton ............... G06F 3/0665 |
| 10,521,147 | B2 | 12/2019 | Compton et al. |
| 10,613,946 | B2 | 4/2020 | Compton et al. |
| 2004/0205312 | A1 | 10/2004 | Zlotnick et al. |
| 2004/0254964 | A1 | 12/2004 | Kodama et al. |
| 2005/0038968 | A1* | 2/2005 | Iwamura ............ G06F 11/2058 711/162 |
| 2005/0071708 | A1 | 3/2005 | Bartfai et al. |
| 2005/0273647 | A1* | 12/2005 | Furuumi ............... G06F 3/0617 714/5.1 |
| 2006/0005074 | A1* | 1/2006 | Yanai .................... G06F 3/0601 714/6.32 |
| 2006/0020753 | A1 | 1/2006 | Cochran et al. |
| 2007/0079062 | A1* | 4/2007 | Miyawaki ............... G06F 3/067 711/112 |
| 2009/0063892 | A1* | 3/2009 | Abdulvahid ........ H04L 67/1095 714/4.4 |
| 2013/0086349 | A1* | 4/2013 | Kaiya .................. G06F 3/0619 711/164 |
| 2015/0135003 | A1 | 5/2015 | Cota-Robles et al. |
| 2015/0350318 | A1* | 12/2015 | Van Assche ........ H04L 67/1095 709/202 |
| 2019/0163373 | A1 | 5/2019 | Compton et al. |
| 2019/0163576 | A1 | 5/2019 | Compton et al. |

OTHER PUBLICATIONS

US Patent Application, for U.S. Appl. No. 15/828,288, (18.719), filed Nov. 30, 2017, invented by Scott B. Compton et al., Total 40 pages.

US Patent Application, for U.S. Appl. No. 15/828,302, (18.746), filed Nov. 30, 2017, invented by Scott B. Compton et al., Total 40 pages.

Office Action, dated Dec. 19, 2018, for U.S. Appl. No. 15/828,302, (18.746) filed Nov. 30, 2018, invented by Scott B. Compton et al., Total 15 pages.

Response to Office Action, dated Mar. 19, 2019, for U.S. Appl. No. 15/828,302, (18.746), filed Nov. 30, 2017, invented by Scott B. Compton et al., Total 14 pages.

US Patent Application, dated Nov. 30, 2017, for U.S. Appl. No. 15/828,311 (18.747), invented by Scott B. Compton et al., Total 56 pages.

Notice of Allowance, dated Dec. 26, 2018, for U.S. Appl. No. 15/828,311 (18.747), invented by Scott B. Compton et al., Total 12 pages.

Lists of Related Applications, pp. 2, dated Mar. 26, 2019.

Office Action, dated Jun. 28, 2019, for U.S. Appl. No. 15/828,288, (18.719), filed Nov. 30, 2017, invented by Scott B. Compton et al., Total 21 pages.

Notice of Allowance, dated May 15, 2019, for U.S. Appl. No. 15/828,302, (18.746), filed Nov. 30, 2017, invented by Scott B. Compton et al., Total 7 pages.

Response to Office Action, dated Sep. 30, 2019, for U.S. Appl. No. 15/828,288, (18.719), filed Nov. 30, 2017, invented by Scott B. Compton et al., Total 15 pages.

Notice of Allowance, dated Nov. 29, 2019, for U.S. Appl. No. 15/828,288, (18.719), filed Nov. 30, 2017, invented by Scott B. Compton et al., Total 10 pages.

Notice of Allowance2, dated Aug. 21, 2019, for U.S. Appl. No. 15/828,302, (18.746), filed Nov. 30, 2017, invented by Scott B. Compton et al., Total 8 pages.

US Patent Application, dated Oct. 11, 2019, for U.S. Appl. No. 16/600,389 (18.746C1), filed Oct. 11, 2019, invented by Scott B. Compton et al., Total 48 pages.

Preliminary Amendment, dated Oct. 11, 2019, for U.S. Appl. No. 16/600,389 (18.746C1), filed Oct. 11, 2019, invented by Scott B. Compton et al., Total 12 pages.

* cited by examiner

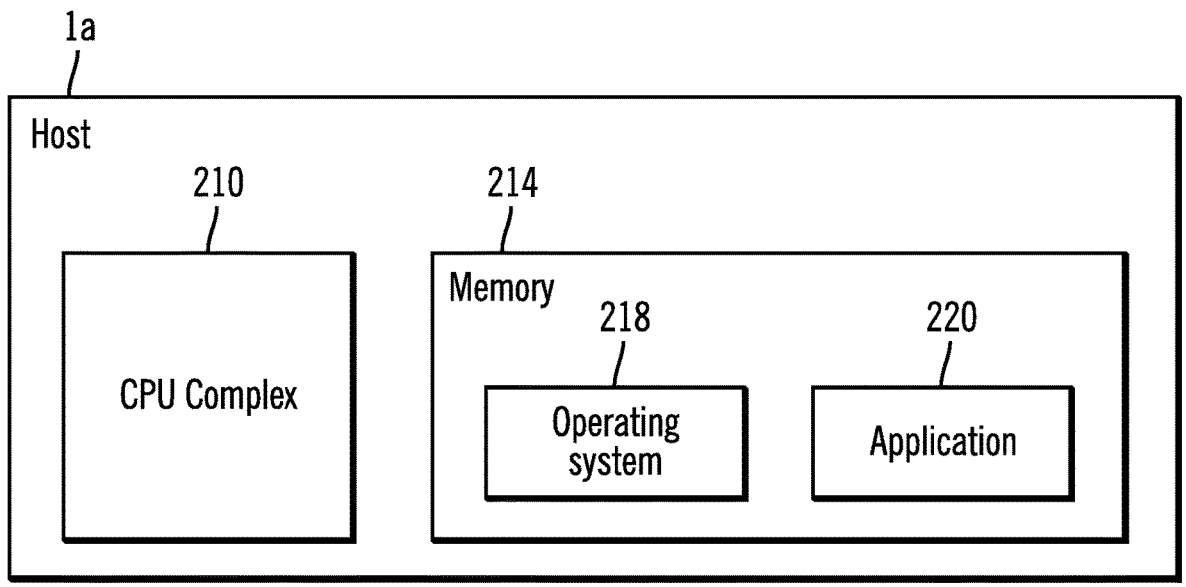
FIG. 4
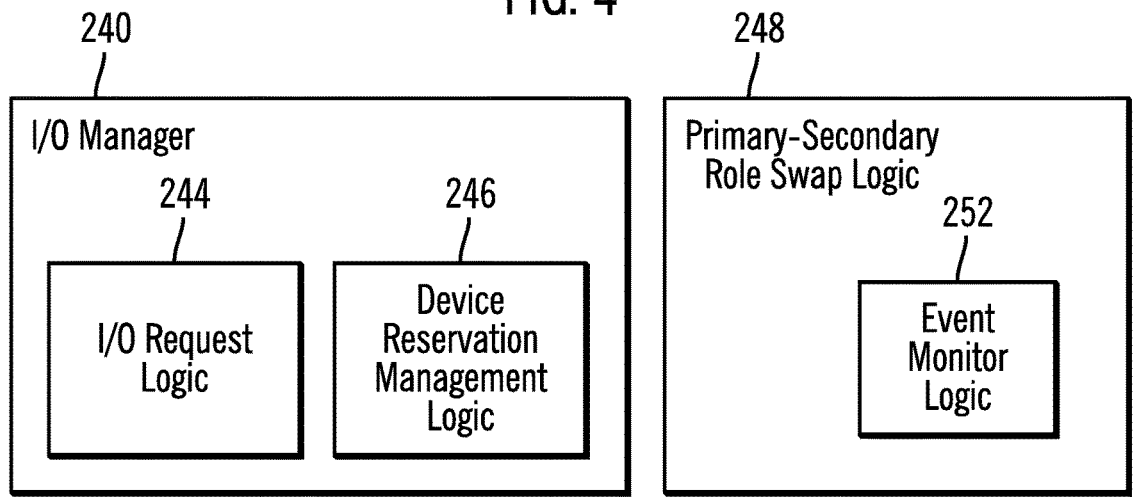
FIG. 5A
FIG. 5B
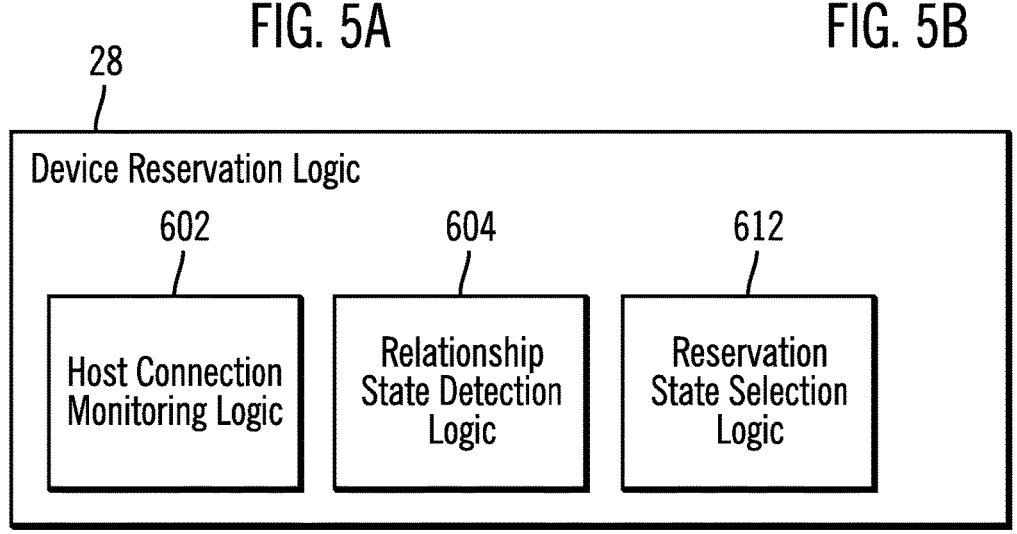
FIG. 6

DEVICE RESERVATION STATE PRESERVATION IN DATA MIRRORING

CROSS-REFERENCE TO RELATED APPLICATION

This application is a continuation of U.S. patent application Ser. No. 15/828,311, filed Nov. 30, 2017, which application is incorporated herein by reference in its entirety.

BACKGROUND OF THE INVENTION

1. Field of the Invention

The present invention relates to a computer program product, system, and method for preserving device reservation states in data synchronous mirroring between primary and secondary data storage devices.

2. Description of the Related Art

Data storage systems, particularly at the enterprise level, are usually designed to provide a high level of redundancy to reduce the risk of data loss in the event of failure of a component of the data storage system. Thus, multiple copies of data are frequently stored on multiple systems which may be geographically dispersed. Thus, data from a host to be stored in the data storage system is typically directed to a primary data storage device at a local site and then replicated to one or more secondary data storage devices which may be geographically remote system from the primary data storage device. One primary data storage device can have multiple secondary relationships in which data directed to a primary data storage device is replicated to multiple secondary data storage devices.

The process of replicating, that is, copying data over to the secondary data storage device can be setup in either a synchronous or asynchronous relationship between the primary data storage device and the secondary data storage device. In a synchronous relationship, any updates to the primary data storage device are typically synchronized with the secondary data storage device, that is, successfully copied over to the secondary data storage device, before the primary data storage device reports to the host that the data storage input/output operation has been successfully completed. Thus, in a synchronous mode, an I/O operation which performed a write operation to the primary data storage device is not considered complete until the mirror operation is completed, that is, it is not complete until the update data has been successfully replicated to the secondary data storage device. Should the mirror operation fail such that the update is not successfully mirrored to the secondary storage, the host may be notified that the update operation was not successfully completed.

Storage systems may alternatively employ an asynchronous relationship between a primary data storage device and a secondary data storage device, particularly if the secondary data storage device is geographically distant from the primary data storage device. In an asynchronous relationship, successful updates to the primary data storage device are typically reported to the host as a successful storage input/output operation without waiting for the update to be replicated to the secondary data storage device. As a result, the host need not wait for the data replication to the secondary data storage device to be completed, and the performance of the host system may be enhanced accordingly.

As the name suggests, in an asynchronous relationship, the data of primary data storage device and the secondary data storage device may not be fully synchronized at any one time. Thus, data stored on the secondary data storage device typically lags that stored in the primary data storage device. Accordingly, new data stored on a primary data storage device may not be stored on the secondary data storage device for an interval of time such as 3-5 seconds, for example.

Selected primary data storage devices such as a volume or logical unit number (LUN), may be reserved for exclusive use by a particular host for I/O data requests. Such reservation of a device for exclusive use of the reservation holding host is often referred to as "hardware serialization." Although secondary data storage devices typically are not reserved directly by a host, one or more secondary data storage devices may be in effect be reserved by association with the reservation of a primary data storage device held by the host.

A mirrored pair of primary and secondary data storage devices may be managed by primary-secondary role swap logic such that if a failure occurs in connection with the primary data storage device, a device role swap can be performed, averting the need to report the error to the I/O requestor. Instead, the host may redirect the I/O request to the secondary data storage device. This swap technique, when employed by the z/OS operating system, is referred to as "HyperSwap."

Failures may occur in a primary data storage device reserved to the host, or may occur in a data path through the network from the host to the reserved primary data storage device. Typically, a number of redundant communication paths are provided between a host and a primary data storage device reserved to that host. Previously, if all communication paths between the host and its reserved data storage device failed or otherwise malfunctioned, the primary data storage device terminated the reservation status of the primary data storage device such that it was no longer reserved for the exclusive use of the host which held the reservation prior to loss of the communication paths.

SUMMARY

One general aspect of device reservation state preservation in accordance with the present description, is directed device reservation logic of a secondary storage controller of a secondary data storage system, receiving a propagated reservation request to reserve on behalf of a first host, a secondary device controlled by the secondary storage controller for exclusive use by the first host for input/output (I/O) data requests wherein if the propagated reservation request is granted, other hosts are excluded from use of the secondary device for I/O data requests. In response to the propagated reservation request, host connection monitoring logic of the secondary storage controller determines as to whether the secondary storage controller has communication connectivity with the first host. In response to a determination that the secondary storage controller lacks communication connectivity with the first host, device reservation state selection logic of the secondary storage controller, grants the propagated reservation request as a peer reservation of the secondary device on behalf of the first host, in a peer reservation state. In response to a determination that the secondary storage controller has communication connectivity with the first host, reservation state selection logic of the secondary storage controller, grants the propagated reservation request as a full reservation of the secondary device on behalf of the first host, in a full reservation state.

In another aspect, device reservation logic of a primary storage controller of a primary data storage system, receives a host-initiated reservation request to reserve on behalf of the first host a primary device controlled by the primary storage controller for exclusive use by the first host for I/O data requests wherein if the host-initiated reservation request is granted, other hosts are excluded from use of the primary device for I/O data requests. In response to the host-initiated reservation request, relationship state detection logic of the primary storage controller determines whether there is a synchronous mirroring relationship established between the primary device controlled by the primary storage controller and the secondary device controlled by the secondary storage controller. In response to a determination that there is a synchronous mirroring relationship between the primary and secondary devices, device reservation logic of the primary storage controller, propagates the reservation request to be received by the secondary storage controller of the secondary data storage system to reserve the secondary device for exclusive use by the first host for I/O data requests wherein if the propagated reservation request is granted other hosts are excluded from use of the secondary device for I/O data requests.

In yet another aspect, wherein the reservation state selection logic of the secondary storage controller, granted the propagated reservation request as a full reservation of the secondary device on behalf of the first host, in a full reservation state, host connection monitoring logic of the secondary storage controller determines whether communication connectivity for all communication paths between the secondary storage controller and the first host has been lost. In response to a determination that communication connectivity for all communication paths of between the secondary storage controller and the first host has been lost, relationship state detection logic of the secondary storage controller determines whether a synchronous mirroring relationship between the primary and secondary devices is active. In response to a determination that communication connectivity for all communication paths of between the secondary storage controller and the first host has been lost and the synchronous mirroring relationship between the primary and secondary devices remains active, a full reservation of the secondary device on behalf of the first host, is converted to a peer reservation of the secondary device on behalf of the first host, in a peer state.

In still another aspect, wherein reservation state selection logic of the primary storage controller, granted the host-initiated reservation request as a full reservation of the primary device on behalf of the first host, in a full reservation state, host connection monitoring logic of the primary storage controller determines whether communication connectivity for all communication paths between the primary storage controller and the first host has been lost. In response to a determination that communication connectivity for all communication paths between the primary storage controller and the first host has lost, relationship state detection logic of the primary storage controller determines whether a synchronous mirroring relationship between the primary and secondary devices is active. In response to a determination that the synchronous mirroring relationship between the primary and secondary devices remains active, host connection monitoring logic of the secondary storage controller is queried by reservation state selection logic of the primary storage controller, to determine whether at least one path from the secondary storage controller to the first host has communication connectivity with the first host. In response to a determination that the secondary storage controller lacks a path with communication connectivity with the first host, the reservation of the primary device held on behalf of the first host is released. In response to a determination that at least one path from the secondary storage controller to the first host has communication connectivity with the first host, the full reservation of the primary device on behalf of the first host, is converted to a peer reservation of the primary device on behalf of the first host, in a peer reservation state.

In still another aspect, wherein reservation state selection logic of a storage controller, granted a reservation request as a peer reservation of the device on behalf of the first host, in a peer reservation state, host connection monitoring logic of the storage controller determines whether communication connectivity for at least one communication path between the storage controller and the first host has been restored. In response to a determination that communication connectivity for all communication paths of between the storage controller and the first host remains lost, the reservation for a reserved device is maintained in a peer reservation state. In response to a determination that communication connectivity for at least one communication path between the storage controller and the first host has been restored, a peer reservation of the reserved device on behalf of the first host, is converted to a full reservation for a reserved device on behalf of the first host, in a full reservation state.

In yet another aspect, relationship state detection logic of a storage controller detects whether the synchronous mirroring relationship between the primary and secondary devices has become suspended. In response to a detection that the synchronous mirroring relationship between the primary and secondary devices has become suspended, reservation state selection logic of the storage controller releases a reservation of a reserved device on behalf of the first host if the reservation state of the reserved device is a peer reservation state, and maintains a reservation of the reserved device if the reservation state of the reserved device is a full reservation state.

Implementations of the described techniques may include hardware, a method or process, or computer software on a computer-accessible medium. Other features and aspects may be realized, depending upon the particular application.

BRIEF DESCRIPTION OF THE DRAWINGS

FIG. 4 illustrates an example of a host for use in a system employing device reservation state preservation in accordance with one aspect of the present description.

FIGS. 5A and 5B illustrate logic elements of the host of FIG. 4.

FIG. 6 depicts an embodiment of device reservation logic for a storage controller employing device reservation state preservation in accordance with one aspect of the present description.

DETAILED DESCRIPTION

Figure 1:
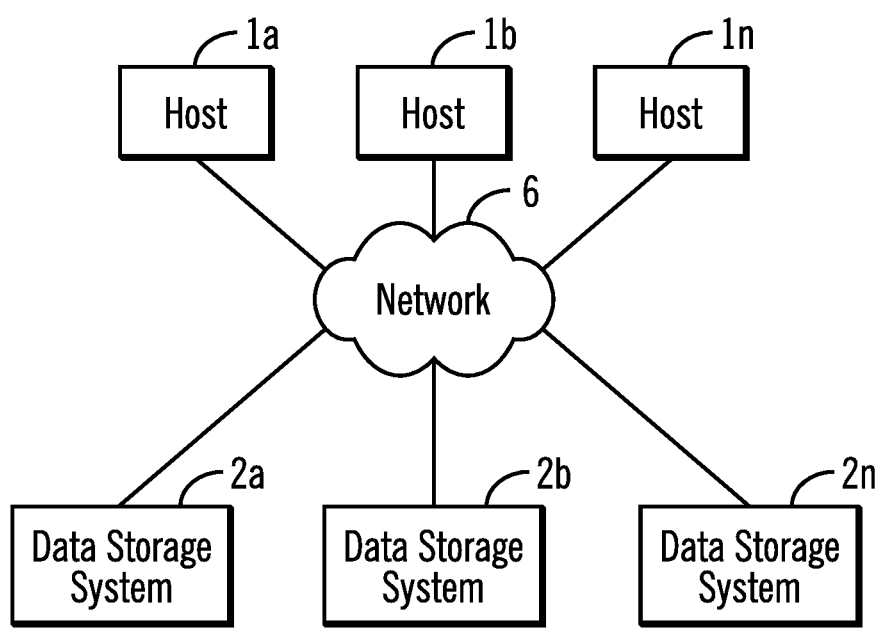
FIG. 1 illustrates an embodiment of a computing environment employing device reservation state preservation in accordance with the present description.

Reservation by a single host of both the primary and secondary volumes in a synchronous mirroring relationship can facilitate maintaining data serialization, that is, consistency of data on both the primary and secondary volumes in a synchronous mirroring relationship. In some systems, a device such as a primary volume controlled by a primary storage controller may be reserved for exclusive use on behalf of a particular host for input/output (I/O) operations of that host. Such a device reservation may be propagated by the primary storage controller to a secondary storage controller in a synchronous mirroring environment such that both the primary volume controlled by a primary storage controller and a secondary volume controlled by a secondary storage controller are both reserved on behalf of the same host. Consequently the host can maintain serialization on shared volumes even if a disaster recovery (DR) situation requires that the I/O workload be moved to the secondary storage controller. However, it is appreciated herein that in the event of a disaster recovery situation, a storage controller, absent device reservation state preservation in accordance with the present description, may not maintain the volume reservations long enough for the host system to recognize the event and complete all appropriate disaster recovery processing for that volume.

For example, in a situation where a primary storage controller loses communication connectivity on all communication paths to a reserving host, the primary storage controller of prior storage systems typically simply released the reservation previously held on behalf of that host. However, it is appreciated herein that when the primary storage controller released the reservation of the primary volume due to a loss of all communication connectivity to the reserving host, the utility of a counterpart or partner reservation of the secondary volume of the mirror relationship to the host may be substantially degraded because the assurance of data of serialization is typically lost. For example, upon release of the reservation of the primary volume, another host which is then permitted access to that volume by the release of the reservation, can write data to that volume, which data in turn could be mirrored to the secondary volume of the mirror relationship prior to the mirror relationship being terminated. As a result, data serialization which may be required by the disaster recovery host to successfully complete a swap of I/O operations to the secondary storage controller, may have been compromised by premature release of the reservation.

It is appreciated herein that if the storage controller instead of releasing the reservation in response to a loss of all communication connectivity to the reserving host, instead maintained the reservation of the primary volume, other problems may result. For example, although such an alternative approach may facilitate disaster recovery in some circumstances, it is appreciated herein that operations of other hosts may be disrupted. For example, if the event which lead to loss of communication connectivity on all communication paths to the reserving host was not of a disaster recovery magnitude but was instead more localized such as a crash or reset of the reserving host, continued maintenance of the reservation of the primary volume may prevent access to that volume by other hosts for extended periods of time. Further, manual intervention by a system operator may be needed to release the reservation and restore access to the volume for other hosts.

It is further appreciated herein that a storage controller frequently is not able to determine whether the total loss of communication connectivity to the reserving host is associated with an event which will lead to a full disaster recovery process, or whether the total loss of communication connectivity is associated with a less serious, more localized event such as a temporary crash or reset of the reserving host system. As noted above, prior storage systems typically simply released the reservation of the primary volume where all communication connectivity to the reserving host was lost. As a result, the release occurred whether or not the loss of communication connectivity was temporary due to a crash or reset of the reserving host such that release of the reservation may be the more appropriate action, or was due to a more serious event leading to disaster recovery, such that maintenance of the reservation might have been the more appropriate action.

In one aspect of device reservation state preservation in accordance with the present description, reservation state preservation logic provides for an intermediate reservation state, referred to herein as a "peer" reservation state, which may be maintained by a storage controller in the event of a total loss of communication connectivity to the reserving host so long as a peer or partner storage controller of the mirror relationship still has communication connectivity to the host. The peer reservation state as used herein, is a reservation state intermediate between a full reservation state for a device, and a fully released state in which a reservation of the device has been completely released. One example of a peer reservation state of the present disclosure is the state of a volume reservation that is being held by its storage controller on behalf of a reserving host as identified by a particular path group identification (ID) which has been established for a group of communication paths from the reserving host to the storage controller holding the reservation, when communication connectivity has been lost on all communication paths associated with that path group ID.

As explained in greater detail below, provision of the intermediate, peer reservation state facilitates the storage controller maintaining, in the event of loss of all communication connectivity to the reserving host, a reservation of a volume or device long enough for the host system to recognize whether the event causing loss of all communication connectivity is an event calling for disaster recovery processing, and if so, to complete all appropriate disaster recovery processing associated with that device while the reservation of the device is maintained in the peer reservation state. For example, in the event of a disaster recovery scenario where the intention is for the host to resume processing on one of the secondary controllers of a mirror relationship, an intermediate, peer reservation which had been converted from a full reservation due to loss of all communication connectivity to the reserving host, may be held by the primary storage controller of the mirror relationship on behalf of the reserving host, so long as the associated peer or partner secondary storage controller of the mirror relationship can validate that it has communication connectivity to the reserving host. Consequently, a corresponding reservation which had been propagated to the secondary storage controller, can together with the peer reservation maintained by the primary storage controller of the mirror relationship, ensure that data serialization is maintained in a disaster recovery scenario notwithstanding that the primary storage controller lost all communication connectivity to the reserving host.

Conversely, in the event that the secondary storage controller of the mirror relationship has, like the primary storage controller of the mirror relationship, lost all communication connectivity to the reserving host, a full reservation held by the primary storage controller on behalf of the reserving host may be completely released rather than converted to a peer reservation. As a result, other hosts will have access to the previously reserved device. Because the secondary storage controller of the mirror relationship has also lost all communication connectivity to the reserving host, the reserving host likely will not be able to switch I/O operations to the secondary storage controller, obviating the need in many circumstances for the reservation on the primary storage controller to be maintained.

In another example, in the event that the mirror relationship is suspended, in another aspect of device reservation state preservation in accordance with the present description, reservation state preservation logic can, in one embodiment, completely release an intermediate, peer reservation state to permit other hosts to have access to the previously reserved device. Because the mirror relationship has been suspended, data writes by other hosts will not be mirrored to the secondary device of the suspended mirror relationship, and data serialization will not be compromised by the release of the peer reservation in many circumstances.

Thus, in one aspect of device reservation state preservation in accordance with the present description, device reservation state preservation logic provides in addition to a fully released state, two different types or states of volume reservations, that is, both a full reservation in which a volume reservation is in a full reservation state, and an intermediate peer reservation in which a volume reservation is in a peer reservation state. The additional peer reservation state can be particularly useful in an operational environment in which volume reservations are propagated from a primary to a secondary storage controller in a synchronous mirror relationship such as, for example, the "Synchronous Peer-to-Peer Remote Copy (Metro Mirror) relationship" provided by various storage systems marketed by the International Business Machines (IBM). In one embodiment, these two different types of reservations are:

Full Reservation: A traditional volume or other device reservation, in which the reserving host has both exclusive access to the reserved device for input/output operations and communication connectivity to the storage controller which controls the reserved device. As used herein, a full reservation is a device reservation in a full reservation state.

Peer Reservation: A reservation on a volume or other device where hosts other than the reserving host are not permitted access to the reserved device for input/output operations notwithstanding that the reserving host does NOT have communication connectivity to the storage controller that controls the reserved device. As used herein, a peer reservation is a device reservation in a peer reservation state.

As explained in greater detail below, in one embodiment, a full reservation may be maintained indefinitely by a storage controller on behalf of the reserving host so long as the host can maintain communication connectivity to the storage controller that controls the volume. Also, a full Reservation of a primary volume may be instantiated directly by the host issuing a reservation request to the primary storage controller which controls that primary volume and the reservation request is granted by that storage controller. A full reservation may also be instantiated by a storage controller converting an existing peer reservation maintained on behalf of a reserving host, to a full reservation should the reserving host reestablish communication connectivity to the storage controller over a path identified the group path ID associated with the reservation. Conversion of a peer reservation to a full reservation state may be applied to either a primary or secondary volume, should the reserving host establish or reestablish communication connectivity to the associated primary or secondary storage controller controlling that primary or secondary volume.

With respect to peer reservations, in one embodiment, a peer reservation for a secondary device may be maintained by a secondary storage controller controlling that secondary device so long as the device remains in an active, full duplex synchronous mirroring relationship. Once the mirroring relationship is no longer active, the peer reservation of the secondary device is released.

A peer reservation for a primary device may be maintained by a primary storage controller controlling that primary device so long as the device remains in an active, full duplex synchronous mirroring relationship, and a partner secondary storage controller of the mirroring relationship can acknowledge that its partner reservation is not a peer reservation, that is, that the partner secondary storage controller can verify that it still has communication connectivity over at least one path of the path group ID, such that the partner reservation maintained by the secondary storage controller of the mirroring relationship is a full reservation. Once the mirroring relationship is no longer active or all the partner secondary storage controllers lose all communication connectivity with the reserving host over the paths of the path group ID, the peer reservation of the primary device is released.

In one embodiment, a peer reservation is not instantiated directly by a host. Instead, a peer reservation may be directly instantiated by a secondary storage controller in response to a primary storage controller propagating a reservation to a secondary storage controller of a mirroring relationship. Also, a secondary storage controller may convert an existing full reservation in an active mirroring relationship to a peer reservation should that storage controller lose all communication connectivity over the paths of the path group ID to the reserving host. A primary storage controller may convert an existing full reservation in an active mirroring relationship to a peer reservation should that storage controller lose all communication connectivity over the paths of the path group ID to the reserving host, if the partner secondary storage controller of the mirroring relationship can acknowledge that its partner reservation is not a peer reservation, that is, that the partner secondary storage controller can verify that it still has communication connectivity over at least one path of the path group ID, such that the partner reservation maintained by the secondary storage controller of the mirroring relationship is a full reservation.

A system of one or more computers may be configured for device reservation state preservation in accordance with the present description, by virtue of having software, firmware, hardware, or a combination of them installed on the system that in operation causes or cause the system to perform device reservation management for overcoming communication path disruptions operations. For example, one or more computer programs may be configured to perform device reservation state preservation by virtue of including instructions that, when executed by data processing apparatus, cause the apparatus to perform the actions.

The operations described herein are performed by logic which is configured to perform the operations either automatically or substantially automatically with little or no system operator intervention, except where indicated as being performed manually. Thus, as used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom VLSI circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several memory devices. Similarly, operational data may be identified and illustrated herein within logic elements, and may be embodied in any suitable form and organized within any suitable type of data structure. The operational data may be collected as a single data set, or may be distributed over different locations including over different storage devices.

In the illustrated embodiment, a mirror relationship identifies a source storage location, such as a primary storage location, and a target storage location, such as a secondary storage location, in which data stored at the source storage location is to be replicated or otherwise copied to the target storage location. Thus, as used herein, a source storage location and a target storage location are storage locations related by a mirror relationship.

Furthermore, as used herein, the term "device" in the context of a device reservation, refers to a storage location containing one or more units of data storage such as one or more volumes, logical unit numbers (LUNs), cylinders, tracks, segments, extents, or any portion thereof, or other unit or units of data suitable for transfer or storage. Thus, a source device and the associated target device which may be reserved on behalf of a host, may each be a storage volume. However, it is appreciated that a source device and a target device unit may each be of a size other than a volume, for example. It is further appreciated that a device which may be reserved on behalf of a host may be a physical device or a virtual device.

Implementations of the described techniques may include hardware, a method or process, or computer software on a computer-accessible medium. FIG. 1 illustrates an embodiment of a computing environment employing device reservation state preservation in accordance with the present description. A plurality of hosts 1a, 1b . . . 1n may submit Input/Output (I/O) requests to one or more data storage systems 2a, 2b, 2n over a network 3 to access data stored by the data storage systems. The hosts 1a, 1b . . . 1n may be separate physical devices or may be virtual devices implemented using assigned resources of partitions of a server, for example. In a similar manner, the data storage systems 2a, 2b . . . 2n may be separate physical devices or may be virtual devices implemented using assigned resources of partitions a server, for example.

Figure 2:
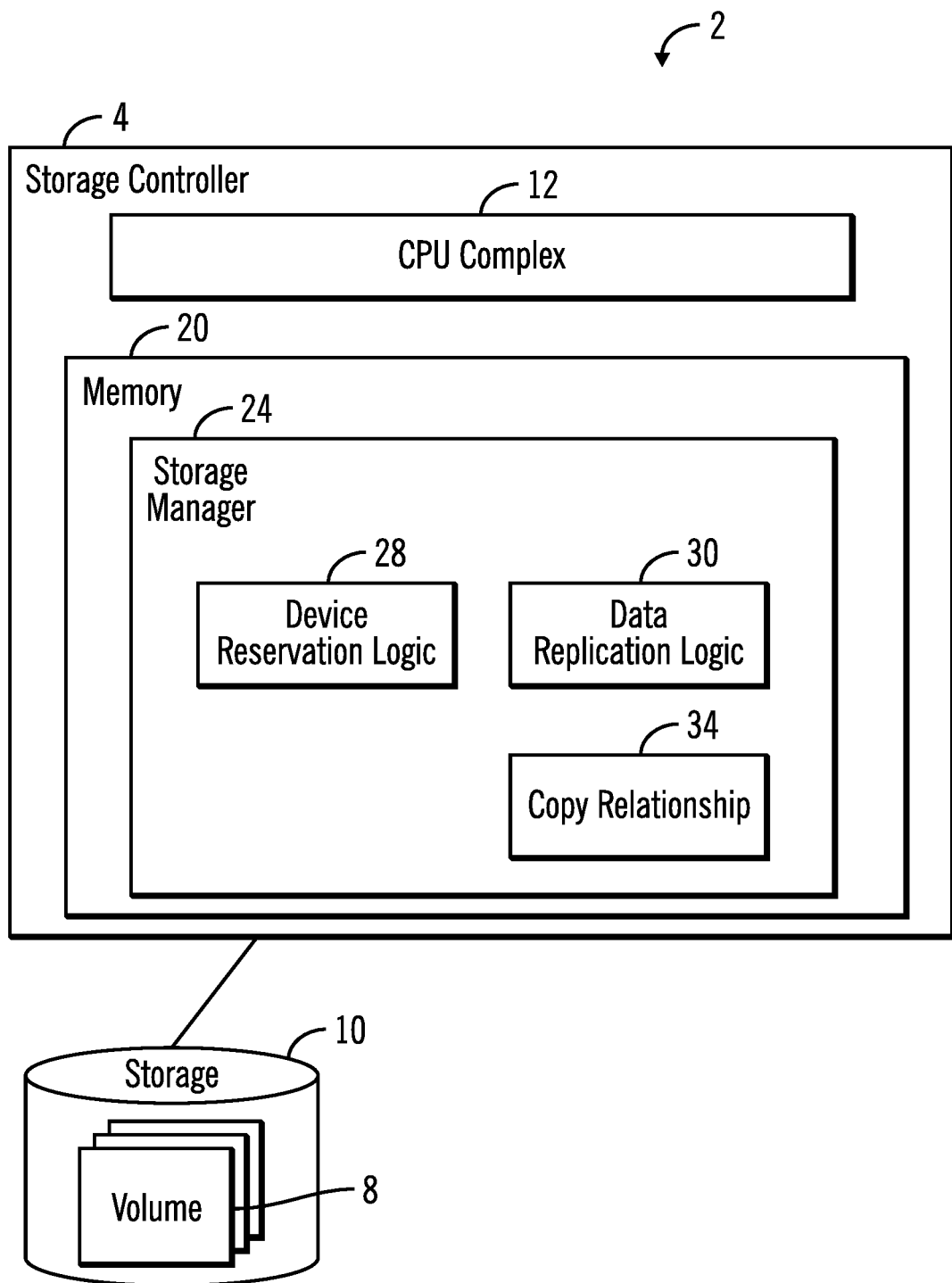
FIG. 2 illustrates an example of a data storage system for use with a host and employing device reservation state preservation in accordance with the present description.
Figure 3:
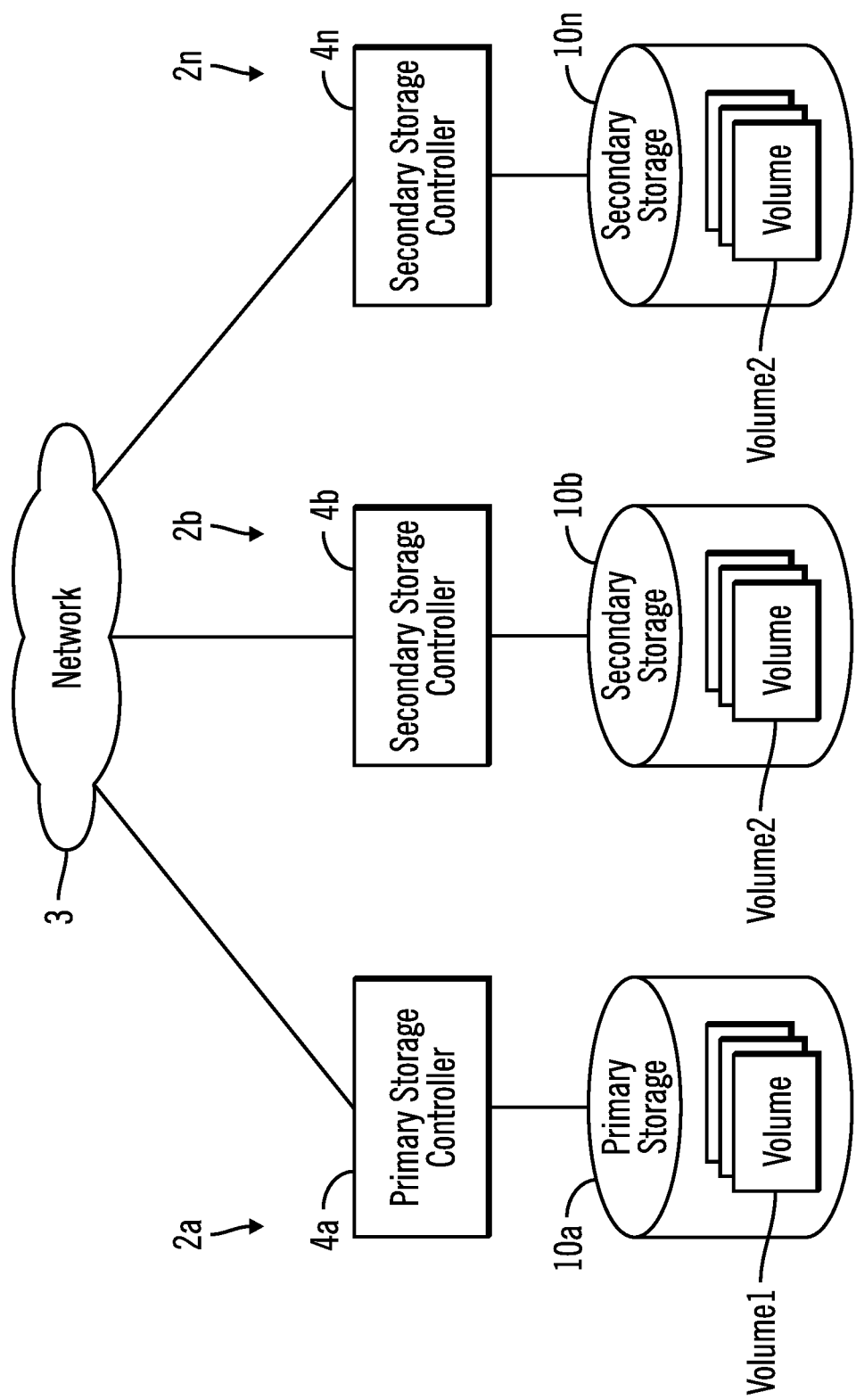
FIG. 3 illustrates an example of a storage system having a primary data storage system and one or more secondary data storage systems for use in a system employing device reservation state preservation in accordance with the present description.

FIG. 2 shows an example of a data storage system such as the system 2, for example, in greater detail. Thus, each data storage system 2 (FIG. 2), 2a, 2b . . . 2n (FIG. 1) includes a storage controller or control unit 4 (FIG. 2), 4a (FIG. 3), 4b . . . 4n which accesses data at volumes 8 (e.g., Logical Unit Numbers, Logical Devices, Logical Subsystems, etc.) in storage represented by one or more storage drives 10, 10a, (FIG. 3), 10b (FIG. 3). Each storage controller 4, 4a, 4b . . . 4n includes a CPU complex 12 (FIG. 2), including processor resources provided by one or more processors or central processing units, each having a single or multiple processor cores. In this embodiment, a processor core contains the components of a CPU involved in executing instructions, such as an arithmetic logic unit (ALU), floating point unit (FPU), and/or various levels of cache (such as L1 and L2 cache), for example. It is appreciated that a processor core may have other logic elements in addition to or instead of those mentioned herein.

Each storage controller 4 (FIG. 2), 4a (FIG. 3), 4b . . . 4n further has a memory 20 that includes a storage manager 24 for managing storage operations including writing data to or reading data from an associated storage drive 10, 10a (FIG. 3), 10b, . . . 10n respectively, in response to an I/O data request from the host holding the reservation of a device such as a storage volume of one of the data storage systems 2 (FIG. 2), 2a (FIG. 1), 2b, . . . 2n. The storage operations managed by the storage manager 24 further include data replication operations from a reservable primary volume1 (FIG. 3) of a primary data storage system such as the data storage system 2a, for example, to a reservable secondary volume2 at one or more secondary data storage systems such as the secondary data storage systems 2b, . . . 2n, for example.

As explained in greater detail below, the storage manager 24 includes device reservation logic 28 which in one aspect of the present description, provides an intermediate, peer reservation state to facilitate the storage controller maintaining, in the event of loss of all communication connectivity to the reserving host, a reservation of a volume or device long enough for the host system to recognize whether the event causing loss of all communication connectivity is an event calling for disaster recovery processing, and if so, to complete all appropriate disaster recovery processing associated with that device while the reservation of the device is maintained. Conversely, in the event that the secondary storage controller of the mirror relationship has, like the primary storage controller of the mirror relationship, lost all communication connectivity to the reserving host, a full reservation held by the primary storage controller on behalf of the reserving host may be completely released rather than converted to a peer reservation.

In the illustrated embodiment, the storage manager 24 including the device reservation logic 28 is depicted as software stored in the memory 20 and executed by the CPU complex 12. However, it is appreciated that some or all of the logic functions of the storage manager 24 may be implemented as hardware, software, firmware or combinations of one or more thereof, depending upon the particular application.

The storage manager further includes a data replication logic 30 (FIG. 2) of the storage manager 24 which is configured to synchronously generate copies of the primary volume1 (FIG. 3) of the primary data storage device 2a as a secondary volume2 (FIG. 3) of the secondary data storage systems 2b . . . 2n. A pair of reservable volumes, volume1, volume2 are in an synchronous copy or mirror relationship 34 such that updates to the primary volume1 are synchronously mirrored to each secondary volume2.

One or more copy relationships 34, which may be maintained by the data replication logic 30 for the primary and secondary storage controllers 4a, 4b (FIG. 3) associate primary storage locations in the primary storage drive 10a and corresponding secondary storage locations in the secondary storage drive 10b, such that updates to the primary storage drive 10a locations are mirrored, that is, copied to the corresponding secondary storage drive 10b locations. For example, source storage locations in a primary storage volume1 (FIG. 3) of storage drive 10a may be synchronously mirrored in a mirror data replication operation to target storage locations of a secondary volume2 of the storage drive 10b pursuant to a mirror copy relationship 34 (FIG. 2). Similarly, source storage locations in the primary storage volume1 (FIG. 3) of storage drive 10a may be synchronously mirrored in a mirror data replication operation to additional target storage locations of a secondary volume2 of the storage drive 10b of each of the other secondary data storage systems as represented by the secondary data storage system 2n, pursuant to a mirror copy relationship 34 (FIG. 2).

In the illustrated embodiment, a copy relationship 34 comprises a peer-to-peer synchronous mirror relationship for a pair of storage locations in which updates to the primary (source) storage locations of the mirror relationship 34 are synchronously mirrored to the secondary (target) storage locations of the mirror relationship 34. It is appreciated that other types of copy relationships may be established, depending upon the particular application.

In the configuration illustrated in FIG. 3, the storage controller 4a and the data storage drive 10a have been configured as a primary storage control unit and the primary storage, respectively, of a primary data storage system 2a. Similarly, the storage controller 4b and its data storage drive 10b have been configured as a secondary storage control unit and a secondary storage, respectively, of a secondary data storage system 2b. Hence, in the configuration depicted in FIG. 3, the storage controller 4a will be referred to as a primary storage controller or control unit 4a, and the data storage drive 10a will be referred to as a primary storage drive 10a. Similarly, the storage controller or control unit 4b will be referred to as a secondary storage controller or control unit 4b and the data storage drive 10b will be referred to as a secondary data storage drive 10b. In this embodiment, there may be multiple secondary data storages such that a copy relation can be in a one to many relationship, which is also referred to as a multi-target relationship. Thus, additional storage controllers as represented by the storage controller 4n are referred to herein as a secondary storage controllers or control units 4n and the data storage drive 10n is referred to as a secondary data storage drive 10n. As used herein, a partner storage controller is a storage controller which controls a volume or device of a synchronous mirror relationship.

In a particular copy relationship, the source unit is often referred to as the primary and the target unit is often referred to as the secondary. Replication relationships are defined between storage units of the primary data storage drive 10a and the secondary data storages 10b . . . 10n. Notwithstanding a reference to the data storage drive 10a as "primary" and the data storages 10b . . . 10n as "secondary," particular storage units of the data storages 10a, 10b, 10n may play both a primary (or source role) and a secondary (or target role) depending upon the particular copy relationship.

In data replication systems, data is typically maintained in volume pairs, comprising a primary volume in a primary storage device and a corresponding secondary volume in a secondary storage device that includes an identical copy of the data maintained in the primary volume. The primary and secondary volumes are identified by a copy relationship in which the data of the primary volume, also referred to as the source volume, is copied to the secondary volume, also referred to as the target volume. Primary and secondary storage controllers may be used to control access to the primary and secondary data storage devices.

The primary storage controller 4a is located at a first site and the secondary storage controller 4b is located at a second site which may be geographically or functionally remote from the first site. Thus, in this example, the first site may be at a local site and the second site may be at geographically remote sites separated by a short or long geographical distance from the local site and from each other. Alternatively, the local and remote site may be relatively close such as in different buildings in the same general geographical location, in different rooms of the same building, in different machines in the same room, or in different portions or partitions of the same machine, of the network 3.

The storage manager 24 (FIG. 2) in one embodiment may transfer data from the primary storage drive 10a (FIG. 3) to a secondary storage drive 10b, 10n in tracks. As used herein, the term track may refer to a physical or virtual track of a disk storage unit but may also reference to other units of data configured in the storage drive 10, 10a, 10b, . . . 10n such as a bit, byte, word, segment, page, block (such as a Logical Block Address (LBA)), cylinder, volume, logical unit number (LUN) etc., which may be a part of a larger grouping of data units, such as a volume, logical device, etc.

In one embodiment, the storage devices 10, 10a, 10b, 10n may be comprised of one or more sequential access storage devices, such as hard disk drives and magnetic tape or may include non-sequential access storage devices such as solid state drives (SSD), for example. Each storage device 10, 10a, 10b, 10n may comprise a single sequential or non-sequential access storage device or may comprise an array of storage devices, such as a Just a Bunch of Disks (JBOD), Direct Access Storage Device (DASD), Redundant Array of Independent Disks (RAID) array, virtualization device, tape storage, flash memory, etc.

One mode of the data replication logic 30 managing the copy relationships, may be implemented with synchronous copy operations, such as a peer-to-peer remote copy (PPRC) program modified as appropriate in accordance with present description. The described operations may be implemented with other programs such as other copy programs or other global recovery programs modified as appropriate in accordance with present description.

The system components 1a, 1b . . . 1n, 4, 4a, 4b, 4n, 10, 10a, 10b, 10n are connected to the network 3 which enables communication among these components. Thus, the network 3 includes a fabric which may comprise a Storage Area Network (SAN), Local Area Network (LAN), Intranet, the Internet, Wide Area Network (WAN), peer-to-peer network, wireless network, arbitrated loop network, etc. Communication paths from the storage subsystems to the hosts 1a, 1b, . . . 1n may be based upon a particular host attachment protocol such as Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths includes instructions and other software controlling communication protocols and the operation of the communication hardware in accordance with the communication protocols, if any. It is appreciated that other communication path protocols may be utilized, depending upon the particular application.

A typical host as represented by the host 1a of FIG. 4 includes a CPU complex 210 and a memory 214 having an operating system 218 and an application 220 that cooperate to read data from and write data updates to the primary storage drive 10a (FIG. 3) or secondary storage drive 10b, 10n via a storage controller 4a, 4b, 4n, respectively. An example of a suitable operating system is the z/OS operating system. It is appreciated that other types of operating systems may be employed, depending upon the particular application.

In the illustrated embodiment, each host such as the host 1a (FIG. 4) includes an input/output (I/O) manager 240 (FIG. 5A) which may be a part of the host operating system 218 or an application 220 (or both). Thus, in one embodiment, the I/O manager 240 is depicted as software stored in the memory 214 and executed by the CPU complex 210. However, it is appreciated that the logic functions of the I/O manager 240 may be implemented as hardware, software, firmware or combinations of one or more thereof, depending upon the particular application.

The I/O manager 240 (FIG. 5A) includes I/O request logic 244 which issues in response to a read or write operation requested by an I/O requestor such as an application 220, an I/O data request to a storage controller 4a of a primary data storage device, for example, to read data from the selected primary data storage device, or write data to the selected primary data storage device. The I/O manager 240 of the host 1a further includes device reservation management logic 246 configured to request reservation of a selected primary data storage devices for exclusive use by the host 1a for I/O data requests. Such reservation of a device for exclusive use of the reservation holding host is often referred to as "hardware serialization." The status of a particular data storage device as reserved to a particular host, may be indicated by suitable data structures maintained by the reservation management logic 246 of the reservation holding host, and suitable data structures maintained by the storage controller which controls the particular device reserved to a particular host.

In the illustrated embodiment, each host such as the host 1a (FIG. 4) further includes primary-secondary role swap logic 248 (FIG. 5B) which may be a part of the host operating system 218 or an application 220 (or both). Examples include a HyperSwap Manager in a z/OS Hyper-Swap and Geographically Dispersed Parallel Sysplex (GDPS). Thus, in one embodiment, primary-secondary role swap logic 248 is depicted as software stored in the memory 214 and executed by the CPU complex 210. However, it is appreciated that the logic functions of primary-secondary role swap logic 248 may be implemented as hardware, software, firmware or combinations of one or more thereof, depending upon the particular application.

The primary-secondary role swap logic 248 of the host is configured to selectively swap primary and secondary roles of the primary and secondary data storage devices, respectively in the event such a swap is needed to maintain data input/output and replication operations. For example, if monitor logic 252 of the I primary-secondary role swap logic 248 determines that the primary data storage system 2a (FIG. 3) having the volume1 of a pair of volumes, volume1, volume2 reserved to the host 1a, has been lost to the host 1a due to a hardware or software failure of the primary data storage system 2a, for example, the primary-secondary role swap logic 248 of the host is configured to selectively swap primary and secondary roles of the data storage systems 2a, 2b so that the data storage system 2b which was originally the secondary data storage system, is re-assigned the role of the primary data storage system.

More specifically, if data of the data storage system 2a (FIG. 3) is being synchronously mirrored (using, for example, peer to peer remote copy, (PPRC)), the data storage system 2a is considered a primary data storage system and can have one or more secondary data storage systems such as the data storage systems 2b . . . 2n. A synchronously mirrored device pair of the primary and secondary data storage systems 2a, 2b, is managed by the primary-secondary role swap logic 248 which can if appropriate, selectively perform a swap operation, which is referred to as "HyperSwap" when employed by the z/OS operating system. Accordingly, if a failure occurs to the primary data storage system 2a, a device role swap can be selectively performed by the primary-secondary role swap logic 248. The swap can obviate reporting an error to the I/O requestor. Instead, the host can re-issue the I/O data request to the secondary data storage system 2b upon successfully reassigning the data storage system 2b as the primary data storage system.

Failures may not only occur in a primary data storage system having a device reserved to the host, but may alternatively occur in a data communication path through the network 3 from the host to the primary data storage device which has the reserved device. Typically, a number of redundant communication paths are provided by the network 3 between a host and a primary data storage system having a device reserved to that host. Such a failure in a data communication path may be detected for example, in connection with an attempted input/output operation by the host which is directed to a device reserved to that host. The reservation is typically identified by a particular path group identification (ID) which has been established for a group of communication paths from the reserving host to the storage controller holding the reservation. If the input/output is directed to the reserved device along a failed or reset communication path of the path group ID, the device reservation logic 28 (FIG. 1) of the storage controller holding the reservation on behalf of the host, is configured to inform the reserving host when communication connectivity has been lost on that communication path. Such a notification is often referred to as a "reset event." The monitor logic 252 is configured to receive such a notification that a communication path to a reserved device of the primary data storage system has been disrupted.

For example, when a fiber optic communication path of the network 3 (FIG. 1) is dropped and physically reestablished (referred to as loss and reestablishment, respectively, of "light"), the storage controller logically reestablishes the logical communication path so that is logically operational. When the host operating system 218 (FIG. 4) attempts an I/O operation down this logically reestablished communication path, the device reservation logic 28 presents a reset event to the host to let the host operating system 218 know that light was dropped. This is a signal to the host operating system 218 that it should perform any revalidation of the logically reestablished communication path such as revalidating the logically reestablished communication path for host-initiated I/O operations.

The loss or reset of any single communication path of the group of communication paths identified by the path group identification (ID), will not cause a loss or release of the device reservation of the path group ID. However, when the last communication path of the path group ID is lost or reset, such that no communication path of that path group ID is currently established with communication connectivity between the reserving host and the storage controller, in prior data storage systems, the device reservation previously was lost, that is released by the storage controller.

Thus, previously in prior data storage systems, if all communication paths of a group path ID between the host and its reserved device failed or otherwise malfunctioned such that the storage controller lost all communication connectivity via the communication paths of the path group ID, the storage controller released the reservation of the device of the path group ID such that it was no longer reserved for the exclusive use of the host which held the reservation prior to loss of all communication via the communication paths of the path group ID. Such a release of the reservation occurred even if the loss of all communication connectivity along the paths of the path group ID was just temporary.

FIG. 6 depicts an example of a device reservation logic 28 for device reservation state preservation in accordance with one embodiment of the present description. The device reservation logic 28 is configured to convert a full device reservation to an intermediate, peer reservation state in the event of loss of all communication connectivity with the reserving host, to facilitate the storage controller maintaining a reservation of a volume or device long enough for the host system to recognize whether the event causing loss of all communication connectivity is an event calling for disaster recovery processing. Thus, in the event of a disaster recovery scenario, the peer reservation also maintains the device reservation long enough for the host to complete all appropriate disaster recovery processing associated with that device while the reservation of the device is maintained by the storage controller in the peer reservation state. Conversely, in the event that the secondary storage controller of the mirror relationship has, like the primary storage controller of the mirror relationship, lost all communication connectivity to the reserving host, a reservation held by the primary storage controller on behalf of the reserving host may be completely released rather than converted to a peer reservation.

In this example, the device reservation logic 28 includes host connection monitoring logic 602 which is configured to detect whether the communication paths of a group path ID for a device reservation have communication connectivity with the reserving host, or whether the communication paths have either been lost (that is, no longer fully operational) or the communication path has been reset and not yet validated by the host for I/O operations, as described above, such that the communication path lacks communication connectivity with the reserving host. As used herein, a communication path is considered to have communication connectivity if communication over the communication path is both operational and has been logically validated by the host for I/O operations. Thus, a communication path having communication connectivity with a reserving host is a communication path that has not been lost nor is in a state of having been reset and awaiting revalidation by the host for I/O operations to be initiated or resumed. As described in greater detail below, the device reservation logic 28 further includes relationship state detection logic 604 and reservation state selection logic 612 in this embodiment.

Figure 7A:
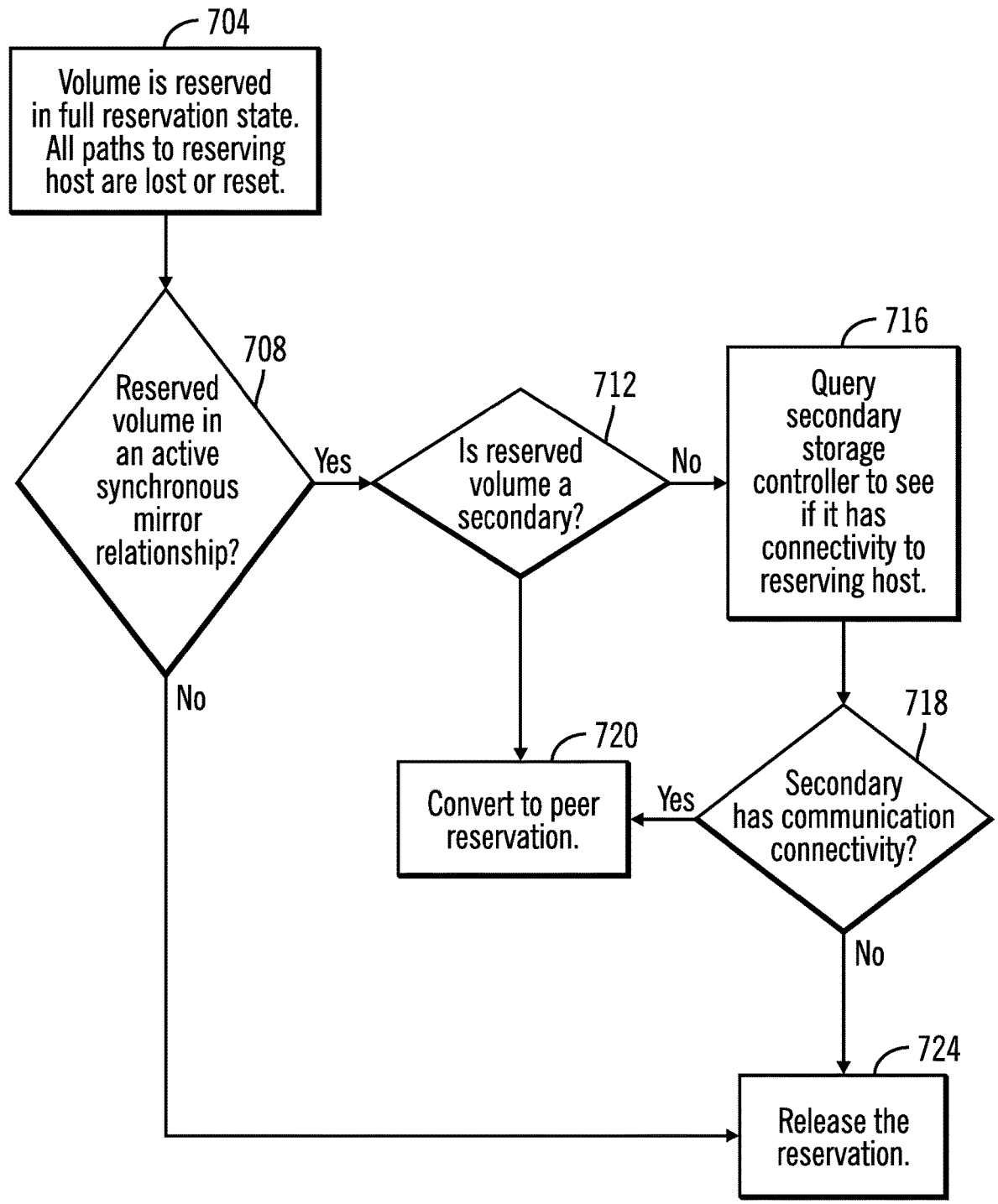
FIGS. 7A and 7B depict example of operations of device reservation logic for a storage controller employing device reservation state preservation in accordance with one aspect of the present description.

FIG. 7A depicts an example of operations by the device reservation logic 28 in the event of that all communication paths of a path group ID associated with a device full reservation have been either lost or reset (and not yet revalidated). Thus, the host connection monitoring logic 602 of the storage controller controlling the reserved device is configured to determine whether at least one path from the storage controller to the host 1a in this example, has communication connectivity with the reserving host 1a. If not, reservation state selection logic 612 (FIG. 6) is configured to, in response to a loss of all communication connectivity between the reserving host and the storage controller controlling the reserved device, either convert an existing full reservation state to a peer reservation state, or release the full reservation to a released state, as a function of whether the reserved device is currently in an active, full duplex synchronous mirror relationship, whether the reserved device is a primary or secondary device, and whether a secondary storage controller for a partner secondary device has also lost all communication connectivity between the reserving host and the secondary storage controller. In one example, the reserved device is volume1 (FIG. 3) of the primary data storage system 2a, and the reservation state selection logic of the primary storage controller, initially granted a host-initiated reservation request as a full reservation of the primary device on behalf of the reserving host, in a full reservation state. Thus, in this example, the reservation state of the primary device is initially a full reservation (block 704, FIG. 7A) state for volume1 such that initially, at least one communication path of the path group ID for the reserved volume1 retains communication connectivity to the reserving host, such as host 1a.

However, in response to the host connection monitoring logic of the primary storage controller determining that communication connectivity for all communication paths between the primary storage controller and the host 1a has subsequently been lost (block 704, FIG. 7A), the relationship state detection logic 604 (FIG. 6) of the device reservation logic 28 of the primary storage controller 4a, (FIG. 3) is configured to determine (block 708) whether volume1 is in an active, full duplex synchronous mirroring relationship. In one example, the relationship state detection logic 604 may determine that the reserved device, volume1 in this example, is a primary volume of an active, full duplex synchronous mirroring relationship with one or more secondary volumes, such as volume2 of one or more of the secondary data storage systems 2b . . . 2n. In this example, the reserved device is a primary device and is not a secondary volume (block 712, FIG. 7A). Accordingly, reservation state selection logic 612 (FIG. 6) of the device reservation logic of the primary storage controller 4a (FIG. 3), is configured to in response to a determination that the synchronous mirroring relationship between the primary and secondary devices remains active, query (block 716, FIG. 7A) the host connection monitoring logic 602 of a partner secondary storage controller such as secondary controller 4b in this example, to determine (block 718, FIG. 7A) whether at least one path from at least one partner secondary storage controller 4b . . . 4n to the host 1a in this example, has communication connectivity with the reserving host 1a. In addition, the reservation state selection logic 612 (FIG. 6) of the device reservation logic of the primary storage controller 4a (FIG. 3), is configured to, in response to a determination (block 718, FIG. 7A) that at least one path from at least one partner secondary storage controller to the reserving host has communication connectivity with the host, convert (block 720, FIG. 7A) the state of reservation of volume1 from the full state which existed prior to the loss (block 704) of communication connectivity all paths from the primary storage controller 4a to the reserving host 1a, to a peer reservation state (block 720, FIG. 7A).

In this manner, the device reservation logic 28 can convert (block 720, FIG. 7A) a full device reservation to an intermediate, peer reservation state in the event of loss (block 704, FIG. 7A) of all communication connectivity with the reserving host, if the reserved device is a primary device (block 712, FIG. 7A) in an active, full duplex synchronous mirroring relationship (block 708, FIG. 7A), and if at least one partner secondary controller of the mirroring relationship retains (block 718, FIG. 7A) communication connectivity with the reserving host. Because a partner secondary controller of the mirroring relationship retains (block 718, FIG. 7A) communication connectivity with the reserving host, a disaster recovery process in which the reserving host switches I/O operations to the partner secondary controller, is an option should conditions warrant. Thus it is useful to convert the full reservation to the peer reservation to provide additional time for the host system to recognize whether the event causing loss of all communication connectivity with the primary is an event calling for disaster recovery processing and if so, to have sufficient time to complete all appropriate disaster recovery processing associated with that device while the reservation of the device is maintained by the storage controller in the peer reservation state. By preserving the device reservation in the form of the peer reservation state, data serialization may be preserved in an environment in which the reserved device remains in an active, full duplex synchronous mirror relationship and the option of a disaster recovery is preserved.

Alternatively, if it is determined (block 716, FIG. 7A) that all partner secondary controllers of the mirroring relationship lack a path with communication connectivity with the reserving host such that each partner secondary controller has also lost (block 718, FIG. 7A) all communication connectivity with the reserving host, a disaster recovery process in which the reserving host switches I/O operations to a partner secondary controller, is likely not an option. Under these circumstances, the reservation state selection logic 612 (FIG. 6) of the device reservation logic 28 of the primary storage controller 4a (FIG. 3), is configured to in response to a determination (block 718, FIG. 7A) that each partner secondary storage controller lacks a path with communication connectivity with the reserving host, release (block 724, FIG. 7A) the reservation on the primary device, volume1 controlled by the primary storage controller 4a. As a result of the release of the reservation of volume1, other hosts may then obtain access to volume1.

In a similar manner, if the relationship state detection logic 604 (FIG. 6) of the device reservation logic 28 of the primary storage controller 4a, (FIG. 3) determines (block 708) that the reserved device, volume1 in this example, is not in an active, full duplex synchronous mirroring relationship, the reservation state selection logic 612 (FIG. 6) of the device reservation logic 28 of the primary storage controller 4a (FIG. 3), is configured to release (block 724, FIG. 7A) the reservation on the primary device, volume1 controlled by the primary storage controller 4a instead of converting the reservation to a peer reservation. For example, a synchronous mirroring relationship of the reserved device, volume1, may have been suspended such that the reserved device is not longer in an active synchronous mirroring relationship. If so, the reservation on volume1 may be released since any updates to volume1 by other hosts will not be mirrored to the partner secondary devices of the suspended synchronous mirror relationship, and data serialization of the secondary devices of the suspended synchronous mirror relationship will not be comprised by the release of the reservation on the primary device, volume1.

In another example, the reserved device may be a secondary device such as volume2 (FIG. 3) of a secondary data storage system 2b . . . 2n, and the state of the device reservation is again initially a full reservation (block 704, FIG. 7A) state for volume2. The host connection monitoring logic 602 (FIG. 6) of the secondary storage controller is configured to determine whether communication connectivity for all communication paths between the secondary storage controller and the reserving host has subsequently been lost or if at least one path retains communication connectivity with the reserving host. In this example, initially at least one communication path of the path group ID for the reserved volume2 retains communication connectivity between the reserving host, such as host 1a, and the associated secondary controller which controls the reserved device, volume2. Thus, the reservation state selection logic 612 (FIG. 6) of the secondary storage controller, initially granted the propagated reservation request as a full reservation of the secondary device on behalf of the host, in a full reservation state.

However, a subsequent loss or reset of all communication paths (block 704, FIG. 7A) between the secondary controller and the reserving host 1a, resulting in a loss of all communication connectivity with the reserving host 1a may occur. Accordingly, the relationship state detection logic 604 (FIG. 6) of the device reservation logic 28 of the secondary storage controller 4b, 4n, (FIG. 3) is configured to, in response to a determination that communication connectivity for all communication paths of between the secondary storage controller and the reserving host has been lost, determine (block 708) whether volume2 is in an active, full duplex synchronous mirroring relationship. In one example, the relationship state detection logic 604 may determine that the reserved device, volume2 in this example, is a secondary volume (block 712, FIG. 7A) of an active, full duplex synchronous mirroring relationship with a primary volume of a primary data storage system. Accordingly, the reservation state selection logic 612 (FIG. 6) of the device reservation logic of the secondary storage controller 4b ... 4n (FIG. 3), is configured to, in response to a determination that communication connectivity for all communication paths of between the secondary storage controller and the reserving host has been lost (block 704) and the synchronous mirroring relationship between the primary and secondary devices remains active (block 708), convert (block 720, FIG. 7A) the state of reservation of volume2 from the full state which existed prior to the loss (block 704) of communication connectivity of all paths from the secondary storage controller 4b ... 4n to the reserving host 1a, to a peer reservation state (block 720, FIG. 7A).

In this manner, the device reservation logic 28 can convert (block 720, FIG. 7A) a device full reservation to an intermediate, peer reservation state in the event of loss (block 704, FIG. 7A) of all communication connectivity with the reserving host, if the reserved device is a secondary device (block 712, FIG. 7A) and in an active, full duplex synchronous mirroring relationship (block 708, FIG. 7A). Because the reserved device is a secondary device (block 712, FIG. 7A) in an active, full duplex synchronous mirroring relationship (block 708, FIG. 7A), it may be useful to retain the reservation of the secondary device, volume2 in this example, so as to maintain full duplex data serialization between the primary and secondary volumes of the synchronous mirroring relationship notwithstanding that the secondary controller of the secondary device has lost (block 704, FIG. 7A) all communication connectivity with the reserving host. Accordingly, in these circumstances the full reservation on the secondary device volume2 is converted (block 720, FIG. 7A) to a peer reservation rather than releasing the reservation.

However, in a similar manner to that described above in connection with a reserved primary device, if the relationship state detection logic 604 (FIG. 6) of the device reservation logic 28 of the secondary storage controller 4b ... 4n, (FIG. 3) determines (block 708) that the reserved device, volume2 in this example, is not in an active, full duplex synchronous mirroring relationship, the reservation state selection logic 612 (FIG. 6) of the device reservation logic 28 of the secondary storage controller 4b ... 4n (FIG. 3), is configured to release (block 724, FIG. 7A) the reservation on the secondary device, volume2 controlled by a secondary storage controller 4b ... 4n. For example, a synchronous mirroring relationship of the reserved device, volume2, may have been suspended such that the reserved device is no longer in an active synchronous mirroring relationship. If so, the reservation on volume2 may be released (instead of converted to a peer reservation) since maintenance of data serialization is no longer expected and updates to volume2 by other hosts will be permitted.

Although described in connection with a volume sized data unit in this embodiment, it is appreciated that the operations of device reservation state preservation in accordance with the present description are applicable to other sizes and types of data units of various types of storage units of primary and secondary data storage systems, depending upon the particular application.

Figure 7B:
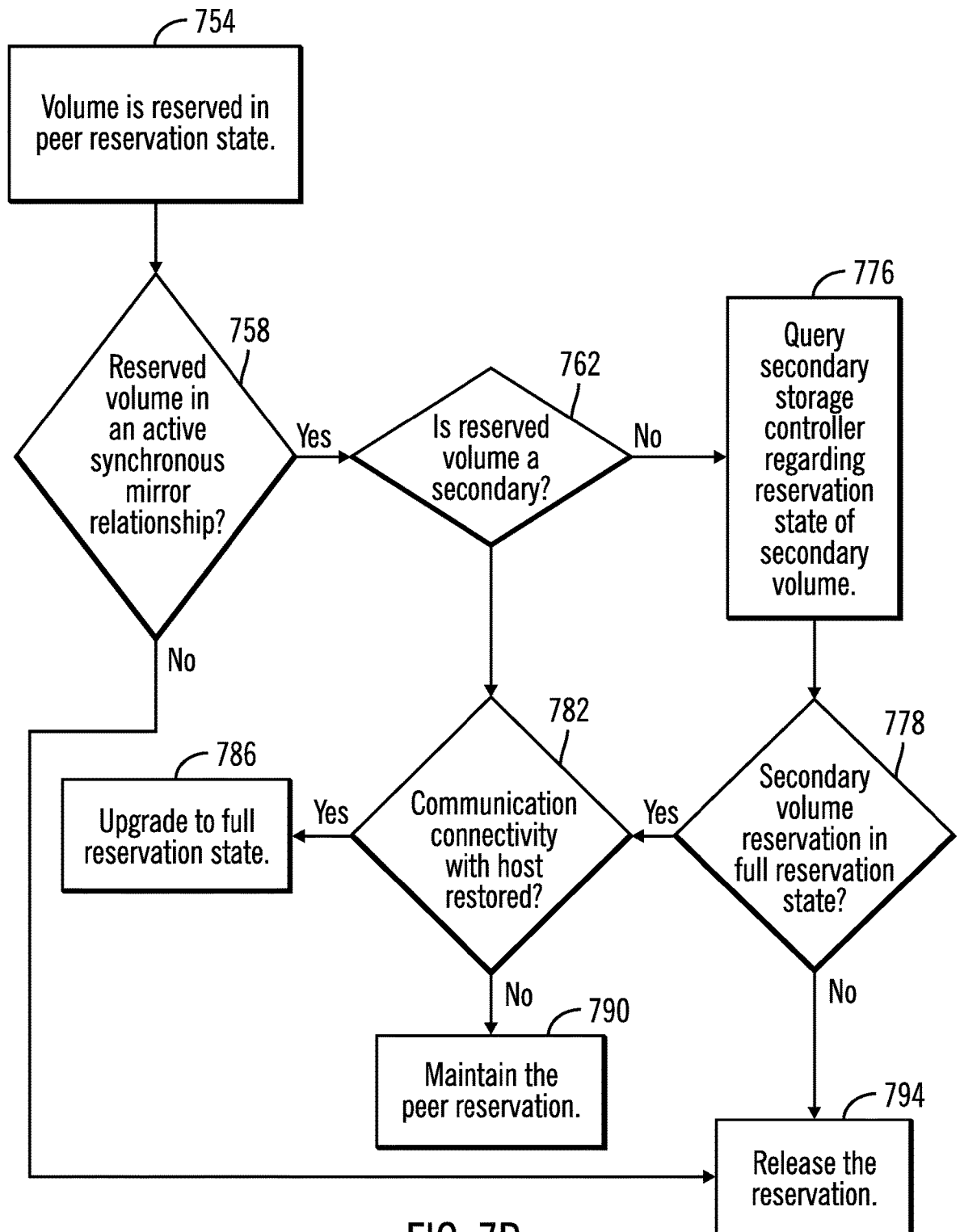

FIG. 7B depicts an example of operations by the device reservation logic 28 in connection with a device having an existing peer reservation state. Thus, in this example, reservation state selection logic of a storage controller, granted a reservation request as a peer reservation of the device on behalf of the reserving host, in a peer reservation state In this example, since communication connectivity was lacking on all paths of the path group ID between the storage controller controlling the device and the reserving host.

In this example, reservation state selection logic 612 (FIG. 6) is configured to maintain or release the peer reservation or upgrade the peer reservation to a full reservation as a function of whether the peer reserved device is currently in an active, full duplex synchronous mirror relationship, whether the reserved device is a primary or secondary device, whether communication connectivity with the reserving host has been restored, and whether the reservation state of a partner secondary device is in a full reservation state.

In one example, the reserved device is primary device volume1 (FIG. 3) of the primary data storage system 2a, and the state of the device reservation is initially a peer reservation (block 754, FIG. 7B) state for volume1 such that initially, no path of the path group ID for the reserved volume1 retains communication connectivity to the reserving host, such as host 1a. The relationship state detection logic 604 (FIG. 6) of the device reservation logic 28 of the primary storage controller 4a, (FIG. 3) is configured to determine (block 758) whether volume1 is in an active, full duplex synchronous mirroring relationship. In one example, the relationship state detection logic 604 may determine that the reserved device, volume1 in this example, is a primary volume of an active, full duplex synchronous mirroring relationship with one or more partner secondary volumes, such as volume2 of one or more partner secondary storage controllers 4b ... 4n. If so, because the reserved device in this example is not a secondary volume (block 762, FIG. 7B), reservation state selection logic 612 (FIG. 6) of the device reservation logic of the primary storage controller 4a (FIG. 3), is configured to query (block 776, FIG. 7B) the reservation state selection logic 612 of a partner secondary storage controller such as secondary controller 4b in this example, to determine whether (block 778, FIG. 7B) the reservation state of at least one partner secondary volume, volume2 in this example, is in a full reservation state. If so, the host connection monitoring logic 602 of the primary storage controller such as primary controller 4a in this example, is configured to determine whether communication connectivity between the primary storage controller 4a and the reserving host 1a has been restored. If so (block 782, FIG. 7B), the reservation state selection logic 612 (FIG. 6) of the device reservation logic of the primary storage controller 4a (FIG. 3), is configured to, in response to a determination (block 782, FIG. 7B) that communication connectivity for at least one communication path between the primary storage controller 4a and the reserving host 1a has been restored, upgrade, that is, convert (block 786 FIG. 7B) the state of reservation of volume1 from the peer reservation state which existed prior to restoration of communication connectivity, to a full reservation state upon restoration (block 782) of communication connectivity with the reserving host. Alternatively, if the primary storage controller 4a still lacks communication connectivity on all the paths of the group path ID of the reservation, the reservation state selection logic 612 (FIG. 6) of the primary storage controller 4a (FIG. 3), is configured to, in response to a determination (block 782, FIG. 7B) that communication connectivity for at least one communication path between the primary storage controller 4a and the reserving host 1a has not been restored, the peer reservation state of the reservation of volume1 is maintained (block 790, FIG. 7B) in the peer reservation state.

In another example, if in response to the query (block 776, FIG. 7B), the reservation state selection logic 612 of each partner secondary storage controllers such as secondary controller 4b in this example, determines (block 778, FIG. 7B) that the reservation state of all of the partner secondary volumes, volume2 in this example, are in a peer reservation state, that is, all the partner secondary controllers of the reserved partner secondary devices lack communication connectivity with the reserving host, the reservation state selection logic 612 (FIG. 6) of the device reservation logic of the primary storage controller 4a (FIG. 3), is configured to release (block 794, the reservation of the primary device, volume1, in this example. In a similar manner, if the relationship state detection logic 604 (FIG. 6) of the device reservation logic 28 of the primary storage controller 4a, (FIG. 3) determines (block 758) that volume1 is no longer in an active, full duplex synchronous mirroring relationship, the reservation state selection logic 612 (FIG. 6) of the device reservation logic of the primary storage controller 4a (FIG. 3), is configured to release (block 794, the reservation of the primary device, volume1, in this example. It is appreciated herein that in circumstances in which the synchronous mirroring relationship is suspended or none of the storage controllers for the partner secondary devices has communication connectivity with the reserving host, the utility of maintaining a peer reservation of the primary device may be lessened such that release of the peer reservation for the primary device may be appropriate to allow other hosts access to the primary device.

In another example, the reserved device may be a partner secondary device such as volume2 (FIG. 3) controlled by a partner secondary storage controller 4b . . . 4n of a secondary data storage system 2b . . . 2n, and the state of the device reservation is again initially a peer reservation (block 754, FIG. 7B) state for volume2 such that initially, no communication path of the path group ID for the reserved volume2 retains communication connectivity between the reserving host, such as host 1a, and the associated secondary controller which controls the reserved device, volume2.

The relationship state detection logic 604 (FIG. 6) of the device reservation logic 28 of the secondary storage controller 4b, 4n, (FIG. 3) is configured to determine (block 758) whether volume2 continues to be in an active, full duplex synchronous mirroring relationship. In one example, the relationship state detection logic 604 may determine that the reserved device, volume2 in this example, is a partner secondary volume (block 762, FIG. 7B) of an active, full duplex synchronous mirroring relationship with a primary volume of a primary data storage system. If so, the host connection monitoring logic 602 of the secondary storage controller such as secondary controller 4b . . . 4n a in this example, is configured to determine whether communication connectivity between the secondary storage controller 4b, 4n and the reserving host 1a has been restored. If so (block 782, FIG. 7B), the reservation state selection logic 612 (FIG. 6) of the device reservation logic of the secondary storage controller 4b, 4n (FIG. 3), is configured to upgrade, that is, convert (block 786 FIG. 7B) the state of the reservation of volume2 from the peer reservation state which existed prior to restoration of communication connectivity, to a full reservation state upon restoration (block 782) of communication connectivity with the reserving host. Alternatively, if the secondary storage controller still lacks communication connectivity on all the paths of the group path ID of the reservation, the peer reservation state of the reservation of volume2 is maintained (block 790, FIG. 7B) in the peer reservation state.

In another example, if the relationship state detection logic 604 (FIG. 6) of the device reservation logic 28 of the secondary storage controller 4b, 4n (FIG. 3) determines (block 758) that volume2 is no longer in an active, full duplex synchronous mirroring relationship, the reservation state selection logic 612 (FIG. 6) of the device reservation logic of the secondary storage controller 4b (FIG. 3), is configured to release (block 794, the reservation of the secondary device, volume2, in this example. It is appreciated herein that in circumstances in which the synchronous mirroring relationship is suspended, the utility of maintaining a peer reservation of the secondary device may be lessened such that release of the peer reservation for the secondary device may be appropriate to allow other hosts access to the secondary device.

Figure 8:
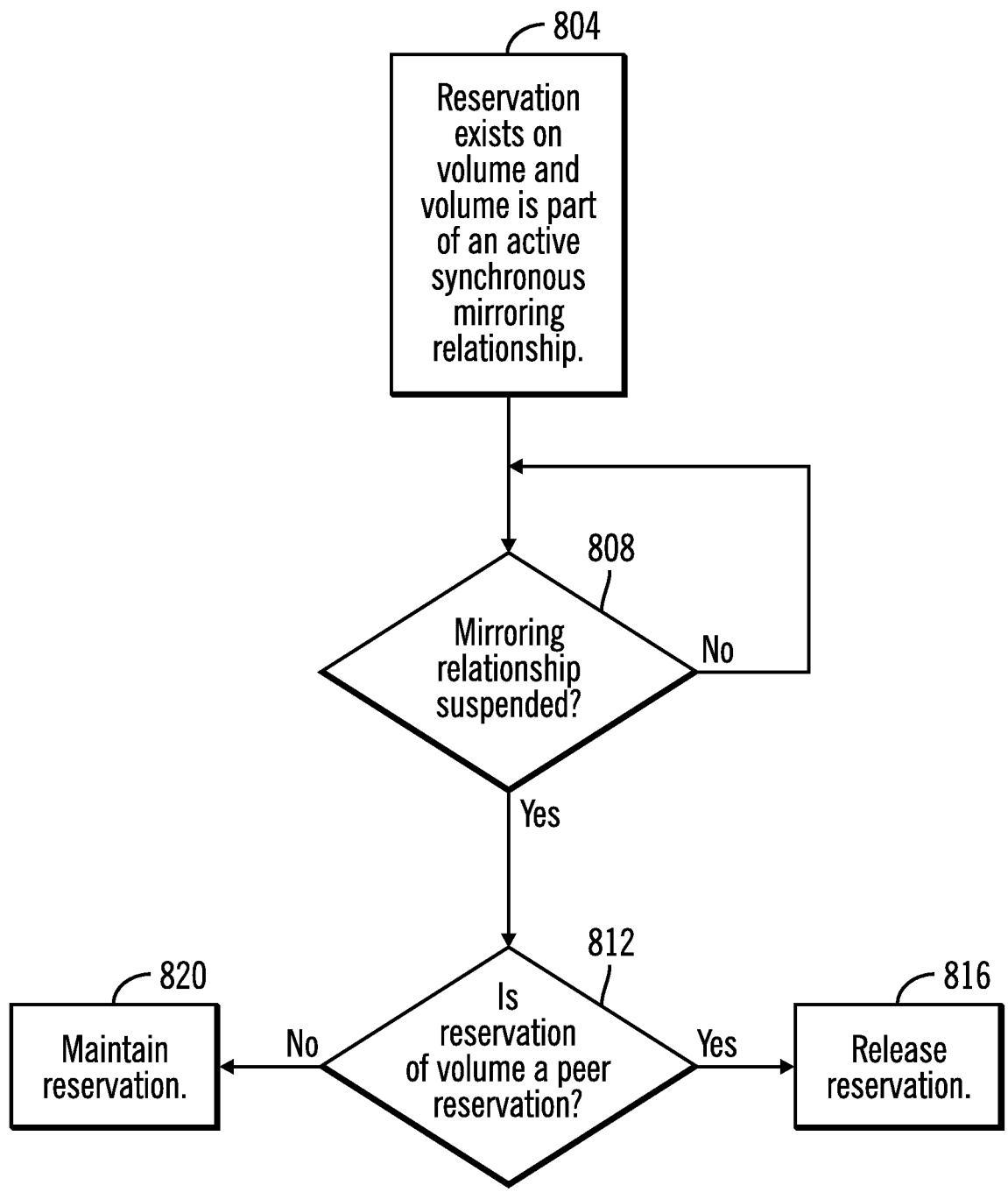
FIG. 8 depicts another example of operations of device reservation logic for a storage controller employing device reservation state preservation in accordance with one aspect of the present description.

In yet another example, if the reservation state of a reserved device, either a reserved primary device or a reserved secondary device is in a full reservation state, such that communication connectivity with the reserving host continues, and if the relationship state detection logic 604 (FIG. 6) of the device reservation logic 28 of the associated storage controller 4a, 4b, 4n (FIG. 3) determines that the reserved device is no longer in an active, full duplex synchronous mirroring relationship, the reservation state selection logic 612 (FIG. 6) of the device reservation logic of the associated storage controller 4a, 4b . . . 4n (FIG. 3), is configured to maintain the full reservation state of the reserve device as described in connection with FIG. 8 below. It is appreciated herein that in circumstances in which the synchronous mirroring relationship is suspended, the utility of maintaining a full reservation of the reserved device may continue since the synchronous mirroring relationship may be restored. Accordingly, maintenance of the full reservation for the secondary device may be appropriate so as to prevent other hosts from accessing the reserved device while communication connectivity with the reserving host continues device.

FIG. 8 depicts an example of operations by the device reservation logic 28 in the event of that an active synchronous mirror relationship for a reserved device, becomes no longer active but is instead suspended. In this example, reservation state selection logic 612 (FIG. 6) is configured to, in response to suspension of the synchronous mirroring relationship, either release or maintain the reservation of the reserved device, as a function of whether the reservation state of the reservation is a full reservation or a peer reservation.

In one embodiment, the device is a volume reserved (block 804, FIG. 8) for exclusive use by a reserving host for input/output operations, and the reserved volume is initially in an active synchronous mirroring relationship which may be at a full duplex state. The relationship state detection logic 604 (FIG. 6) of the storage controller which controls the reserved device, is configured to determine (block 808, FIG. 8) whether the synchronous mirroring relationship of the reserved device (block 804) has subsequently become suspended. If so, the reservation state selection logic 612 (FIG. 6) of the storage controller which controls the reserved device, is configured to, in response to a detection that the synchronous mirroring relationship between the primary and secondary devices has become suspended, determine (block 812, FIG. 8) whether the reservation state of the reserved device is a peer reservation. The reservation state selection logic 612 (FIG. 6) is configured to, in response to a determination (block 812, FIG. 8) that the reservation state of the reserved device is a peer reservation state, release (block 816, FIG. 8) the peer reservation.

For example, if the reserved device is a primary device such as volume1, for example, a synchronous mirroring relationship of the reserved device, volume1, may have been suspended such that the reserved device, volume1, is no longer in an active synchronous mirroring relationship. If so, and if it is determined that the reservation state of the reserved device, volume1, is a peer reservation state at the time the mirroring relationship was suspended, the reservation on volume1 may be released. As a result, any updates to volume1 by other hosts will not be mirrored to the secondary devices of the suspended synchronous mirror relationship, and data serialization of the secondary devices of the suspended synchronous minor relationship will not be comprised by the release of the reservation on the primary device, volume1. Moreover, because the reservation state of the reservation on volume1 was a peer reservation at the time the mirroring relationship was suspended, all connectivity to the reserving host had already been lost. In these circumstances of both loss of communication connectivity with the reserving host and suspension of the mirroring relationship, release of the reservation of the device volume1 may improve system performance by permitting other hosts to have access to the volume.

Conversely, the reservation state selection logic 612 (FIG. 6) is also configured to, in response to a determination (block 812, FIG. 8) that the reservation state of the reserved device, volume1, was a full reservation at the time the mirroring relationship was suspended (block 808, FIG. 8), maintain (block 820, FIG. 8) the full reservation. By maintaining the reservation of the primary device volume1, data serialization of the secondary devices of the suspended synchronous mirror relationship may be maintained or at least not compromised by a premature release of the reservation on the primary device, volume1. Moreover, because the reservation state of the reservation on volume1 was a full reservation at the time the mirroring relationship was suspended, the storage controller 4a of the reserved device volume1 retains communication connectivity with the reserving host. Thus, data serialization with the secondary devices of the suspended synchronous mirror relationship may be maintained in anticipation of a possible restoration of the mirroring relationship. In these circumstances of suspension of the mirroring relationship but maintaining communication connectivity with the reserving host, maintaining the full reservation of the device volume1 may improve system performance by excluding other hosts from having access to the volume having the full reservation which is being maintained.

In another example, if the reserved device is a secondary device such as volume2, for example, and if reservation state of the reservation on volume2 was a peer reservation at the time the mirroring relationship was suspended, all connectivity to the reserving host had already been lost. In these circumstances of both loss of communication connectivity with the reserving host and suspension of the mirroring relationship, release (block 816) of the reservation of the device volume2 may improve system performance by permitting other hosts to have access to the volume. For example, if all communication connectivity with the reserving host has been lost resulting in conversion of the reservation to a peer reservation state as described in connection with FIG. 7A, and subsequently the mirroring relationship was suspended as well as described in connection with FIG. 8, data serialization with the primary and other secondary devices of the suspended synchronous mirror relationship will not be comprised by the release of the reservation on the secondary device, volume2. Moreover, because the reservation state of the reservation on volume2 was a peer reservation at the time the mirroring relationship was suspended, all connectivity to the reserving host had already been lost. In these circumstances of both loss of communication connectivity with the reserving host and suspension of the mirroring relationship, release of the reservation of the device volume1 may improve system performance by permitting other hosts to have access to the volume.

Conversely, if it is determined (block 812, FIG. 8) that the reservation state of the reserved device, volume2, was a full reservation at the time the mirroring relationship was determined (block 808, FIG. 8) to be suspended, the reservation state selection logic 612 (FIG. 6) is configured to maintain (block 820, FIG. 8) the full reservation. By maintaining the reservation of the secondary device volume2, data serialization of the primary and secondary devices of the suspended synchronous mirror relationship may be maintained or at least not compromised by a premature release of the reservation on the secondary device, volume2. Moreover, because the reservation state of the reservation on volume2 was a full reservation at the time the mirroring relationship was suspended, the storage controller 4b . . . 4n of the reserved device volume2 retains communication connectivity with the reserving host. Thus, data serialization with the primary and secondary devices of the suspended synchronous mirror relationship may be maintained in anticipation of a possible restoration of the mirroring relationship. In these circumstances of suspension of the mirroring relationship but maintaining communication connectivity with the reserving host, maintaining the full reservation of the device volume2 may improve system performance by excluding other hosts from having access to the volume having the full reservation.

Figure 9:
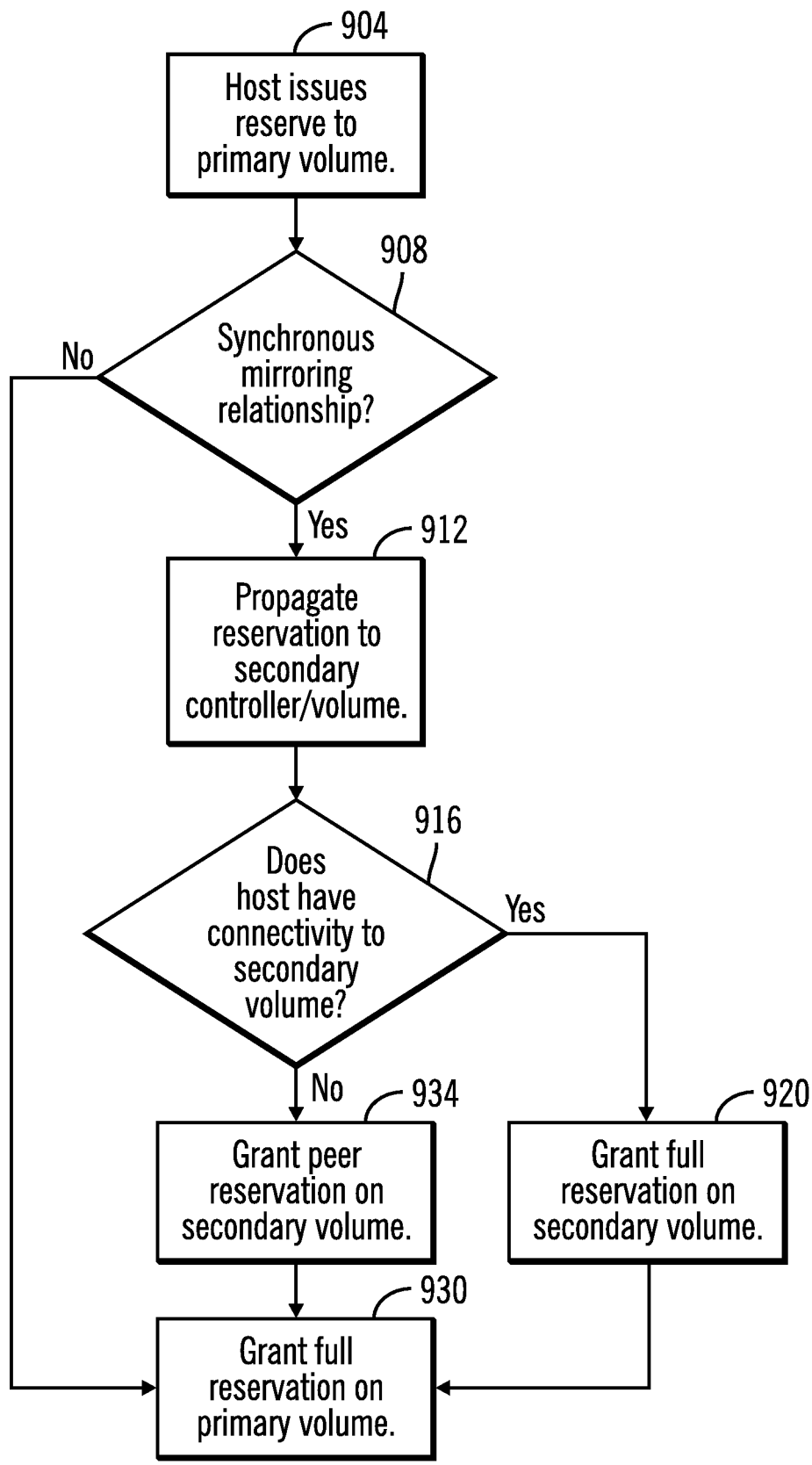
FIG. 9 depicts another example of operations of device reservation logic for a storage controller employing device reservation state preservation in accordance with one aspect of the present description.

FIG. 9 depicts an example of operations by the device reservation logic 28 for instantiating reservations as a function of whether a device to be reserved is in an active synchronous mirror relationship, and whether the device to be reserved is a primary or secondary device in that relationship. In one example, the device reservation logic 28 of the primary storage controller 4a is configured to receive (block 904, FIG. 9) a host-initiated request, that is a request issued by a host such as the host 1a, for example, to reserve on behalf of the host 1a, a primary device such as volume1, for example, controlled by the primary storage controller 4a. The relationship state detection logic 604 (FIG. 6) of the device reservation logic 28 of the primary storage controller 4a, (FIG. 3) is configured to, in response to the request, determine (block 908) whether volume1 is in an active synchronous mirroring relationship. In one example, the relationship state detection logic 604 may determine that the primary device to be reserved device, volume1 in this example, is a primary volume of an active synchronous mirroring relationship with one or more partner secondary volumes, such as volume2 of one or more of the secondary data storage systems 2b . . . 2n. The device reservation logic 28 of the primary storage controller 4a, is configured to, if the subject device of the host reservation request is a primary device in an active synchronous mirroring relationship in this example, propagate (block 912, FIG. 9) a reservation request to each partner storage controller 4b . . . 4n of the active mirroring relationship. The propagated reservation request is based upon the reservation request originated (block 904, FIG. 9) by the host 1a in this example.

Accordingly, device reservation logic 28 of a partner secondary storage controller 4b . . . 4n of a secondary data storage system 2b . . . 2n, is configured to receive a propagated reservation request to reserve on behalf of the host 1a issuing the original reservation request to the primary storage controller 4a, a partner secondary device such as a volume2 of the particular secondary storage controller 4b . . . 4n, for exclusive use by the issuing host 1a (block 904) for I/O operations. Thus, if the propagated reservation request is granted by the receiving secondary storage controller 4b . . . 4n, other hosts are excluded from use of the secondary device volume 2 of the particular secondary storage controller 4b . . . 4n for I/O data requests.

Host connection monitoring logic 602 (FIG. 6) of each partner secondary storage controller 4b . . . 4n receiving the propagated reservation request, is configured to determine (block 916, FIG. 9) whether at least one path from the secondary storage controller 4b . . . 4n to the host 1a in this example, has communication connectivity with the reserving host 1a. If so (block 916, FIG. 9), the reservation state selection logic 612 (FIG. 6) of the device reservation logic of the secondary storage controller 4b . . . 4n (FIG. 3), is configured to grant (block 920, FIG. 9) the propagated reservation request in a full reservation state. In addition, the reservation state selection logic 612 (FIG. 6) of the device reservation logic of the primary storage controller 4a . . . 4n (FIG. 3), is configured to grant (block 930, FIG. 9) the original reservation request (block 904, FIG. 9) from the host 1a, in a full reservation state.

Conversely, if it is determined (block 916) that the secondary storage controller 4b . . . 4n lacks communication connectivity with the host 1a over all communication paths of the group path ID, the reservation state selection logic 612 (FIG. 6) of the device reservation logic of the secondary storage controller 4b . . . 4n (FIG. 3), is configured to, grant (block 934, FIG. 9) the propagated reservation request as a peer reservation of the secondary device volume2. Again, the reservation state selection logic 612 (FIG. 6) of the device reservation logic of the primary storage controller 4a . . . 4n (FIG. 3), is configured to grant (block 930, FIG. 9) the original reservation request (block 904, FIG. 9) from the host 1a, in a full reservation state. For each device for which a reservation is granted, either in a full reservation state or in a peer reservation state, other hosts are excluded from use of the particular device for I/O data requests, until the reservation is released as described above.

Figure 10:
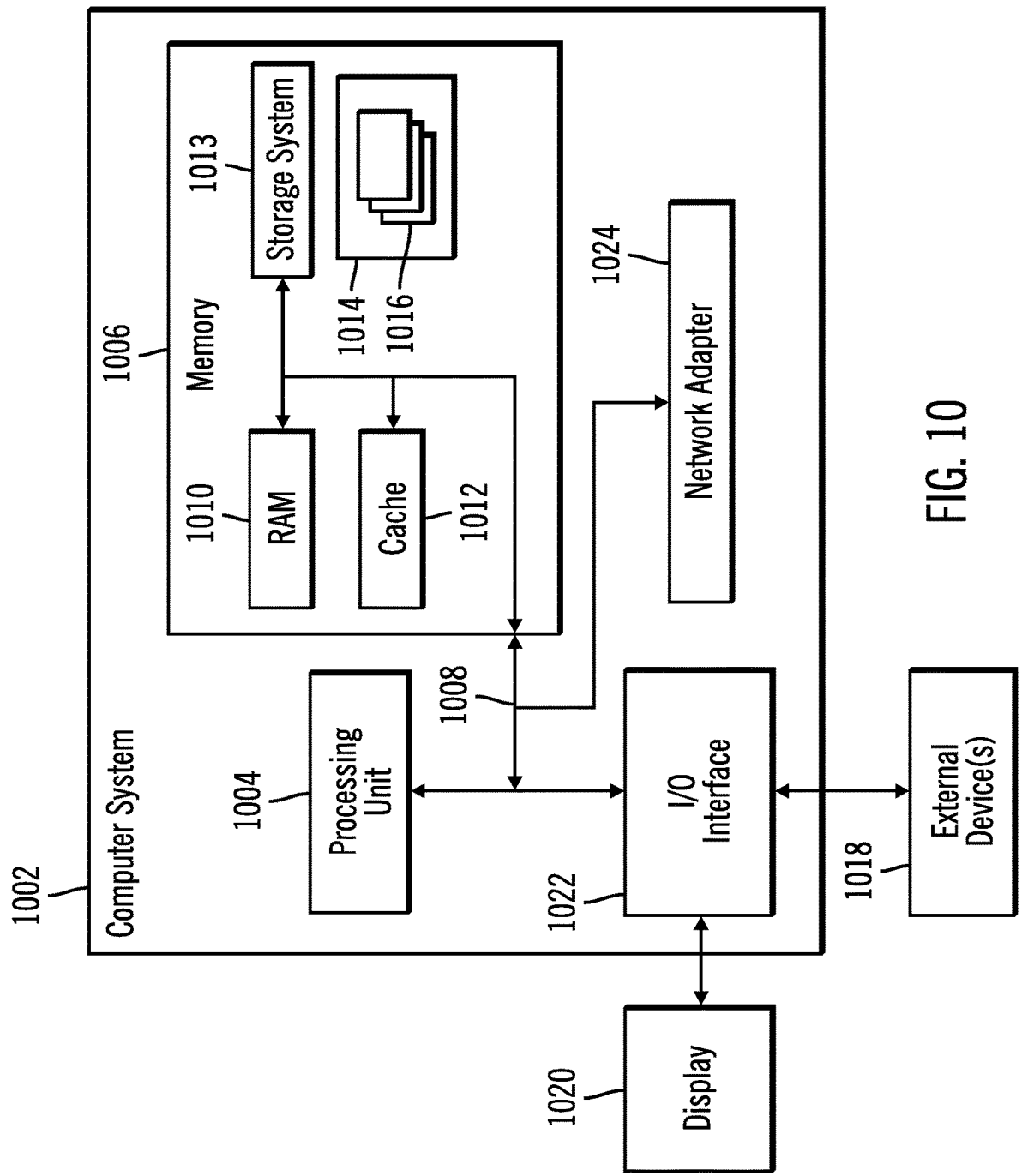
FIG. 10 illustrates a computer embodiment employing device reservation state preservation in accordance with one aspect of the present description.

The computational components of the figures may each be implemented in one or more computer systems, such as the computer system 1002 shown in FIG. 10. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer 1002 may be implemented as program modules 1016 which generally carry out the functions and/or methodologies of embodiments of the invention as described herein. The system of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out processor operations in accordance with aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for use with at least one host, a primary data storage system, the primary data storage system having a primary storage controller and a primary storage drive controlled by the primary storage controller, the primary storage drive having a plurality of primary devices configured to store data, and at least one secondary data storage system, each secondary data storage system having a secondary storage controller and a secondary storage drive controlled by the secondary storage controller, the secondary storage drive having a plurality of secondary devices configured to store data, wherein the computer program product comprises a computer readable storage medium having program instructions embodied therewith, the program instructions executable by a processor of a host to cause processor operations, the processor operations comprising:

receiving by device reservation logic of a secondary storage controller of the secondary data storage system, a propagated reservation request to reserve on behalf of a first host, a secondary device controlled by the secondary storage controller for exclusive use by the first host for input/output (I/O) data requests wherein other hosts are excluded from use of the secondary device for I/O data requests in response to the propagated reservation request being granted; and in response to the propagated reservation request, selectively granting by reservation state selection logic of the secondary storage controller, the propagated reservation request as one of a peer reservation of the secondary device on behalf of the first host, in a peer reservation state, and a full reservation of the secondary device on behalf of the first host, in a full reservation state.

2. The computer program product of claim 1 wherein the operations further comprise:

receiving by device reservation logic of a primary storage controller of a primary data storage system, a host-initiated reservation request to reserve on behalf of the first host a primary device controlled by the primary storage controller for exclusive use by the first host for I/O data requests wherein other hosts are excluded from use of the primary device for I/O data requests in response to the host-initiated reservation request being granted; and in response to the host-initiated reservation request, selectively propagating by device reservation logic of the primary storage controller, the reservation request to be received by the secondary storage controller of the secondary data storage system to reserve the secondary device for exclusive use by the first host for I/O data requests wherein other hosts are excluded from use of the secondary device for I/O data requests in response to the propagated reservation request being granted.

3. The computer program product of claim 2 wherein the reservation state selection logic of the secondary storage controller, granted the propagated reservation request as a full reservation of the secondary device on behalf of the first host, in a full reservation state, and wherein the operations further comprise:

determining by host connection monitoring logic of the secondary storage controller whether communication connectivity for all communication paths between the secondary storage controller and the first host has been lost; and in response to a determination whether communication connectivity for all communication paths of between the secondary storage controller and the first host has been lost, selectively converting a full reservation of the secondary device on behalf of the first host, to a peer reservation of the secondary device on behalf of the first host, in a peer state.

4. The computer program product of claim 2 wherein reservation state selection logic of the primary storage controller, granted the host-initiated reservation request as a full reservation of the primary device on behalf of the first host, in a full reservation state, and wherein the operations further comprise:

determining by host connection monitoring logic of the primary storage controller whether communication connectivity for all communication paths between the primary storage controller and the first host has been lost; and in response to a determination whether communication connectivity for all communication paths between the primary storage controller and the first host has lost, selectively performing one of releasing the reservation of the primary device held on behalf of the first host, and converting the full reservation of the primary device on behalf of the first host, to a peer reservation of the primary device on behalf of the first host, in a peer reservation state.

5. The computer program product of claim 2 wherein reservation state selection logic of a storage controller, granted a reservation request as a peer reservation of the device on behalf of the first host, in a peer reservation state, and wherein the operations further comprise:

determining by host connection monitoring logic of the storage controller whether communication connectivity for at least one communication path between the storage controller and the first host has been restored; and in response to a determination whether communication connectivity for all communication paths of between the storage controller and the first host remains lost, selectively performing one of maintaining the reservation for a reserved device in a peer reservation state, and converting a peer reservation of the reserved device on behalf of the first host, to a full reservation for a reserved device on behalf of the first host, in a full reservation state.

6. The computer program product of claim 2 wherein the operations further comprise:

detecting by relationship state detection logic of a storage controller whether a synchronous mirroring relationship between the primary and secondary devices has become suspended; and in response to a detection whether the synchronous mirroring relationship between the primary and secondary devices has become suspended, reservation state selection logic of the storage controller selectively performing one of releasing a reservation of a reserved device on behalf of the first host in response to the reservation state of the reserved device being in a peer reservation state, and maintaining a reservation of the reserved device in response to the reservation state of the reserved device being in a full reservation state.

7. A method, comprising:

receiving by device reservation logic of a secondary storage controller of a secondary data storage system, a propagated reservation request to reserve on behalf of a first host, a secondary device controlled by the secondary storage controller for exclusive use by the first host for input/output (I/O) data requests wherein other hosts are excluded from use of the secondary device for I/O data requests in response to the propagated reservation request being granted; and in response to the propagated reservation request, selectively granting by reservation state selection logic of the secondary storage controller, the propagated reservation request as one of a peer reservation of the secondary device on behalf of the first host, in a peer reservation state, and a full reservation of the secondary device on behalf of the first host, in a full reservation state.

8. The method of claim 7 further comprising:

receiving by device reservation logic of a primary storage controller of a primary data storage system, a host-initiated reservation request to reserve on behalf of the first host a primary device controlled by the primary storage controller for exclusive use by the first host for I/O data requests wherein other hosts are excluded from use of the primary device for I/O data requests in response to the host-initiated reservation request being granted; and in response to the host-initiated reservation request, selectively propagating by device reservation logic of the primary storage controller, the reservation request to be received by the secondary storage controller of the secondary data storage system to reserve the secondary device for exclusive use by the first host for I/O data requests wherein other hosts are excluded from use of the secondary device for I/O data requests in response to the propagated reservation request being granted.

9. The method of claim 8 wherein the reservation state selection logic of the secondary storage controller, granted the propagated reservation request as a full reservation of the secondary device on behalf of the first host, in a full reservation state, the method further comprising:

determining by host connection monitoring logic of the secondary storage controller whether communication connectivity for all communication paths between the secondary storage controller and the first host has been lost; and in response to a determination whether communication connectivity for all communication paths of between the secondary storage controller and the first host has been lost, selectively converting a full reservation of the secondary device on behalf of the first host, to a peer reservation of the secondary device on behalf of the first host, in a peer state.

10. The method of claim 8 wherein reservation state selection logic of the primary storage controller, granted the host-initiated reservation request as a full reservation of the primary device on behalf of the first host, in a full reservation state, the method further comprising:

determining by host connection monitoring logic of the primary storage controller whether communication connectivity for all communication paths between the primary storage controller and the first host has been lost; and in response to a determination whether communication connectivity for all communication paths between the primary storage controller and the first host has lost, selectively performing one of releasing the reservation of the primary device held on behalf of the first host, and converting the full reservation of the primary device on behalf of the first host, to a peer reservation of the primary device on behalf of the first host, in a peer reservation state.

11. The method of claim 8 wherein reservation state selection logic of a storage controller, granted a reservation request as a peer reservation of the device on behalf of the first host, in a peer reservation state, the method further comprising:

determining by host connection monitoring logic of the storage controller whether communication connectivity for at least one communication path between the storage controller and the first host has been restored; and in response to a determination whether communication connectivity for all communication paths of between the storage controller and the first host remains lost, selectively performing one of maintaining the reservation for a reserved device in a peer reservation state, and converting a peer reservation of the reserved device on behalf of the first host, to a full reservation for a reserved device on behalf of the first host, in a full reservation state.

12. The method of claim 8 further comprising:
detecting by relationship state detection logic of a storage controller whether a synchronous mirroring relationship between the primary and secondary devices has become suspended; and
in response to a detection whether the synchronous mirroring relationship between the primary and secondary devices has become suspended, reservation state selection logic of the storage controller selectively performing one of releasing a reservation of a reserved device on behalf of the first host in response to the reservation state of the reserved device being in a peer reservation state, and maintaining a reservation of the reserved device in response to the reservation state of the reserved device being in a full reservation state.

13. A system for use with at least one host, comprising:
a primary data storage system, the primary data storage system having a primary storage controller and a primary storage drive controlled by the primary storage controller, the primary storage drive having a plurality of primary devices configured to store data; and
at least one secondary data storage system, each secondary data storage system having a secondary storage controller and a secondary storage drive controlled by the secondary storage controller, the secondary storage drive having a plurality of secondary devices configured to store data;
wherein the secondary storage controller includes:
device reservation logic configured to receive a propagated reservation request to reserve on behalf of a first host, a secondary device controlled by the secondary storage controller for exclusive use by the first host for input/output (I/O) data requests wherein if the propagated reservation request is granted, other hosts are excluded from use of the secondary device for I/O data requests; and
reservation state selection logic configured to selectively, in response to a determination whether the secondary storage controller lacks communication connectivity with the first host, grant the propagated reservation request as one of a peer reservation of the secondary device on behalf of the first host, in a peer reservation state, and a full reservation of the secondary device on behalf of the first host, in a full reservation state.

14. The system of claim 13 wherein the primary storage controller includes:
device reservation logic configured to receive a host-initiated reservation request to reserve on behalf of the first host a primary device controlled by the primary storage controller for exclusive use by the first host for I/O data requests wherein other hosts are excluded from use of the primary device for I/O data requests in response to the host-initiated reservation request being granted, and to selectively propagate the reservation request to be received by the secondary storage controller of the secondary data storage system to reserve the secondary device for exclusive use by the first host for I/O data requests wherein other hosts are excluded from use of the secondary device for I/O data requests in response to the propagated reservation request being granted.

15. The system of claim 14 wherein:
the reservation state selection logic of the secondary storage controller, granted the propagated reservation request as a full reservation of the secondary device on behalf of the first host, in a full reservation state;
the system further comprises host connection monitoring logic of the secondary storage controller configured to determine whether communication connectivity for all communication paths between the secondary storage controller and the first host has been lost; and
the reservation state selection logic of the secondary controller is further configured to selectively, in response to a determination whether communication connectivity for all communication paths of between the secondary storage controller and the first host has been lost, convert a full reservation of the secondary device on behalf of the first host, to a peer reservation of the secondary device on behalf of the first host, in a peer state.

16. The system of claim 14 wherein:
reservation state selection logic of the primary storage controller, granted the host-initiated reservation request as a full reservation of the primary device on behalf of the first host, in a full reservation state;
the system further comprises host connection monitoring logic of the primary storage controller configured to determine whether communication connectivity for all communication paths between the primary storage controller and the first host has been lost; and
reservation state selection logic of the primary storage controller is further configured to selectively perform one of in response to a determination whether communication connectivity for all communication paths between the primary storage controller and the first host has been lost, releasing the reservation of the primary device held on behalf of the first host, and converting the full reservation of the primary device on behalf of the first host, to a peer reservation of the primary device on behalf of the first host, in a peer reservation state.

17. The system of claim 14 wherein:
reservation state selection logic of a storage controller, granted a reservation request as a peer reservation of the device on behalf of the first host, in a peer reservation state;
the system further comprises host connection monitoring logic of a storage controller configured to determine whether communication connectivity for at least one communication path between the storage controller and the first host has been restored; and
the reservation state selection logic of the storage controller is further configured to selectively perform one of in response to a determination whether communication connectivity for all communication paths of between the storage controller and the first host remains lost, maintaining the reservation for a reserved device in a peer reservation state, and converting a peer reservation of the reserved device on behalf of the first host, to a full reservation for a reserved device on behalf of the first host, in a full reservation state.

18. The system of claim 14 wherein:
the relationship state detection logic of a storage controller is further configured to determine whether a synchronous mirroring relationship between the primary and secondary devices has become suspended; and
the reservation state selection logic of the storage controller is further configured to selectively, in response to a detection whether the synchronous mirroring relationship between the primary and secondary devices has become suspended, release a reservation of a reserved device on behalf of the first host in response to the reservation state of the reserved device being in a peer reservation state, and maintain a reservation of the reserved device in response to the reservation state of the reserved device being in a full reservation state.

* * * * *